(12) United States Patent
Ide

(10) Patent No.: US 9,209,695 B2
(45) Date of Patent: Dec. 8, 2015

(54) DC-DC CONVERTER AND CONTROL METHOD FOR THE SAME

(75) Inventor: Yohei Ide, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 239 days.

(21) Appl. No.: 14/112,813

(22) PCT Filed: Apr. 11, 2012

(86) PCT No.: PCT/JP2012/002519
§ 371 (c)(1),
(2), (4) Date: Oct. 18, 2013

(87) PCT Pub. No.: WO2012/144163
PCT Pub. Date: Oct. 26, 2012

(65) Prior Publication Data
US 2014/0043005 A1 Feb. 13, 2014

(30) Foreign Application Priority Data
Apr. 20, 2011 (JP) ................... 2011-094305

(51) Int. Cl.
*H02M 3/158* (2006.01)
*H02M 1/32* (2007.01)
*H02M 1/00* (2007.01)

(52) U.S. Cl.
CPC ............. *H02M 3/1588* (2013.01); *H02M 1/32* (2013.01); *H02M 2001/0003* (2013.01); *H02M 2001/0032* (2013.01); *Y02B 70/1466* (2013.01); *Y02B 70/16* (2013.01)

(58) Field of Classification Search
CPC .......... H02M 2001/0032; H02M 1/32; H02M 3/156; H02M 3/1588
See application file for complete search history.

(56) References Cited

U.S. PATENT DOCUMENTS

| 7,170,272 | B2 | 1/2007 | Yoshida |
| 7,936,158 | B2 | 5/2011 | Noda |
| 2006/0113980 | A1 | 6/2006 | Yoshida |
| 2008/0067989 | A1 * | 3/2008 | Kasai et al. .................... 323/271 |
| 2008/0174286 | A1 * | 7/2008 | Chu et al. ....................... 323/271 |
| 2008/0238392 | A1 * | 10/2008 | Cheung et al. ................ 323/283 |
| 2009/0066305 | A1 | 3/2009 | Noda |
| 2009/0072626 | A1 * | 3/2009 | Watanabe et al. ............... 307/85 |
| 2010/0283442 | A1 * | 11/2010 | Nakashima ................... 323/283 |
| 2010/0315055 | A1 * | 12/2010 | Miyazaki ....................... 323/283 |

(Continued)

FOREIGN PATENT DOCUMENTS

| JP | 2000-92824 A | 3/2000 |
| JP | 2006-158097 A | 6/2006 |

(Continued)

*Primary Examiner* — Fred E Finch, III
(74) *Attorney, Agent, or Firm* — Foley & Lardner LLP

(57) ABSTRACT

A DC-DC converter according to the present invention includes a power supply control circuit—that generates pulse signals, an output transistor that is controlled to be turned on and off based on the pulse signal, a rectification transistor—that is controlled to be turned on and of based on a control signal, a coil provided between a node between the output transistor and the rectification transistor, and an external output terminal, a comparator that compares a voltage of the node—with a reference voltage, a first control circuit that generates a control signal based on a comparison result of the comparator, and a second control circuit that generates the control signal based on a backward-current detection timing and a reference timing.

14 Claims, 15 Drawing Sheets

(56) References Cited

U.S. PATENT DOCUMENTS

| | | | |
|---|---|---|---|
| 2011/0018516 A1* | 1/2011 | Notman et al. | 323/284 |
| 2012/0056610 A1* | 3/2012 | Kimura | 323/351 |
| 2012/0212195 A1* | 8/2012 | Kushida et al. | 323/271 |

FOREIGN PATENT DOCUMENTS

| | | |
|---|---|---|
| JP | 2007-318909 A | 12/2007 |
| JP | 2009-71920 A | 4/2009 |
| JP | 2010-239778 A | 10/2010 |

* cited by examiner

DC-DC CONVERTER AND CONTROL METHOD FOR THE SAME

This application is the National Phase of PCT/JP2012/002519, filed Apr. 11, 2012, which claims priority to Japanese Application No. 2011-094302, filed Apr. 20, 2011, the disclosures of which are hereby incorporated by reference in their entirety.

TECHNICAL FIELD

The present invention relates to a DC-DC converter and a control method for the same and, in particular, to a DC-DC converter suitable for reducing a consumption current, and a control method for the DC-DC converter.

BACKGROUND ART

For example, in an a digital camera set, various voltage levels of power supply voltages are needed in order to drive a motor, a memory, a speaker, a backlight, and the like. In order to meet the need, generally, there has been used a DC-DC converter that can generate various voltage levels of output voltages based on one input voltage.

Furthermore, in recent years, it has been required that low power consumption of a digital camera is achieved to enable it to operate for a long time. Therefore, it is being necessary to also reduce a consumption current at the time of low load of a DC-DC converter 1, which had not been taken into consideration before. That is, it is being necessary to enhance a power efficiency at the time of low load of the DC-DC converter 1.

A related art is disclosed in Patent Literature 1. FIG. 13 is a diagram showing an entire configuration of a switching power supply apparatus 200 disclosed in Patent Literature 1. An Nch driver 216 is a circuit that outputs a drive signal DRV_N to drive a synchronous rectification transistor MN201. The Nch driver 216 is further provided with a current direction detection unit that takes in a voltage V_LX1 of a node LX1, and detects a direction of a current flowing through an inductor L201 and the synchronous rectification transistor MN201.

An internal circuit of the Nch driver 216 is shown in FIG. 14. The Nch driver 216 has a current direction detection unit 2161 and a driver signal generation unit 2162. The current direction detection unit 2161 has: an I/V conversion circuit 2163 to which a fixed voltage VREG is supplied; a gate bias circuit 2164 that generates a bias voltage Vg1; an NMOS transistor MN202 that is provided between the node LX1 and the I/V conversion circuit 2163, and in which the bias voltage Vg1 has been applied to a gate thereof; and a comparator 2165 that compares a reference voltage Vref1 with a drain voltage V11 of the transistor MN202.

In the switching power supply apparatus 200, when a main transistor MP201 is turned on by a Pch driver 215 (the synchronous rectification transistor MN201 is turned off), a current flows in a capacitor C201 through the main transistor MP201 and the inductor L201 from a power supply device 211, and the capacitor C201 is charged. In addition, when the synchronous rectification transistor MN201 is turned on by the Nch driver 216 (the main transistor MP201 is turned off), by energy stored in the inductor L201, a current flows in the capacitor C201 through the synchronous rectification transistor MN201 and the inductor L201, and the capacitor C201 is charged. In a latter case, when detecting the change of the voltage V_LX1 of the node LX1, and determining that a direction of the current has reversed, the Nch driver 216 controls the synchronous rectification transistor MN201 to be turned off.

Operational waveforms of the Nch driver 216 are shown in FIG. 15. When a control signal PRDRV_N output from a power supply control circuit 214 of FIG. 13 changes as "L"→"H" (a control signal PRDRV_P changes as "L"→"H", and the main transistor MP201 is turned off), the drive signal DRV_N changes as "L"→"H" by the driver signal generation unit 2162. As a result of it, the synchronous rectification transistor MN201 changes as off→on. As a result of it, a current flows toward the capacitor C201 through the inductor L201 from the synchronous rectification transistor MN201. Therefore, the voltage V_LX1 of the node LX1 becomes a negative voltage lower than a ground voltage GND.

After that, as time elapses, a current of the inductor L201 decreases, and a potential of the node LX1 also rises. When the current of the inductor L201 becomes zero, the voltage V_LX1 of the node LX1 also becomes zero, and after that, a reverse current begins to flow in a direction of the synchronous rectification transistor MN201 from the inductor L201.

Consequently, the reference voltage Vref1 is previously set to be the drain voltage V11 of the transistor MN202 at this time. An output of the comparator 2165 then inverts to be "H"→"L", the drive signal DRV_N changes as "H"→"L" according thereto, and the synchronous rectification transistor MN201 is turned off. As described above, when the voltage V_LX1 of the node LX1 becomes zero, the reverse current that flows toward the synchronous rectification transistor MN201 from the inductor L201 is immediately blocked.

In addition to this, Patent Literature 2 discloses a switching power supply provided with a pair of synchronous rectification switching elements, which is characterized by being provided with a stop control unit for stopping one of the pair of synchronous rectification switching elements when an output voltage exceeds a predetermined voltage.

In addition, Patent Literature 3 discloses a synchronous rectification type switching regulator characterized by forcibly turning off a synchronous rectification transistor to be an interrupted state when detecting the occurrence of a current backflow.

CITATION LIST

Patent Literature

[Patent Literature 1]
Japanese Unexamined Patent Application Publication No. 2010-239778
[Patent Literature 2]
Japanese Unexamined Patent Application Publication No. 2007-318909
[Patent Literature 3]
Japanese Unexamined Patent Application Publication No. 2009-71920

SUMMARY OF INVENTION

Technical Problem

The switching power supply apparatus (DC-DC converter) disclosed in Patent Literature 1 reduces the consumption current by turning off the synchronous rectification transistor MN201, when a current backflow occurs. However, even when the current backflow is likely to occur, such as a case where a load 213 is the low load, the switching power supply apparatus needs to operate to turn on the rectification transistor MN201 once, and to turn it off after detecting the occurrence of the current backflow. That is, even when the current backflow is likely to occur, and the rectification transistor MN201 should always be turned off, the switching power supply apparatus needs to perform control (switch control) to turn on the rectification transistor once and then to turn it off. Therefore, there has been a problem that a consumption current is increased by useless switch control of the rectification transistor in the switching power supply apparatus.

It is to be noted that a percentage of a consumption current by the switch control to a consumption current of the whole circuit is too large to ignore in a state where low load is continued.

As described above, there has been a problem that the consumption current is increased by the useless switch control of the rectification transistor in the DC-DC converter of the related art.

Solution to Problem

A DC-DC converter according to the present invention includes: a power supply control circuit that generates first and second pulse signals of a predetermined duty ratio; a first switching element that is provided between an input voltage terminal to which an input voltage is supplied and an external output terminal, and is controlled to be turned on and off based on the first pulse signal; a second switching element that is provided between a reference voltage terminal to which a first reference voltage is supplied and the external output terminal, and is controlled to be turned on and off in a reversed manner to the first switching element based on a second control signal; an inductor provided between a connection point between the first and second switching elements, and the external output terminal; a comparison circuit that compares a voltage of the connection point with a second reference voltage, and outputs a comparison result; a first control circuit that outputs as a first control signal one of the second pulse signal and a first stop signal that turns off the second switching element, based on the comparison result; and a second control circuit that outputs as the second control signal one of the first control signal and a second stop signal that turns off the second switching element, based on a detection timing when it has been determined by the comparison result that a current is flowing backward toward the second switching element from the external output terminal, and a reference timing.

A control method for a DC-DC converter according to the present invention is a control method for a DC-DC converter including: a power supply control circuit that generates first and second pulse signals of a predetermined duty ratio; a first switching element that is provided between an input voltage terminal to which an input voltage is supplied and an external output terminal, and is controlled to be turned on and off based on the first pulse signal; a second switching element that is provided between a reference voltage terminal to which a first reference voltage is supplied and the external output terminal, and is controlled to be turned on and off in a reversed manner to the first switching element based on a second control signal; and an inductor provided between a connection point between the first and second switching elements, and the external output terminal, the control method including: comparing a voltage of the connection point with a second reference voltage, and outputting a comparison result; outputting one of the second pulse signal and a first stop signal that turns off the second switching element as a first control signal based on the comparison result; and outputting one of the first control signal and a second stop signal that turns off the second switching element as the second control signal based on a detection timing when it has been determined by the comparison result that a current is flowing backward toward the second switching element from the external output terminal, and a reference timing.

According to the above-mentioned circuit configuration, since switch control of the rectification transistor can be suppressed, increase of the consumption current can be suppressed.

Advantageous Effects of Invention

According to the present invention, a DC-DC converter that can suppress the increase of a consumption current can be provided by suppressing switch control of a rectification transistor.

DESCRIPTION OF EMBODIMENTS

Hereinafter, embodiments of the present invention will be explained with reference to drawings. It is to be noted that since the drawings are simple, a technical scope of the present invention must not be narrowly construed based on the description of the drawings. In addition, the same symbol is given to the same component, and duplicative explanation is omitted.

Embodiment 1

Figure 1:
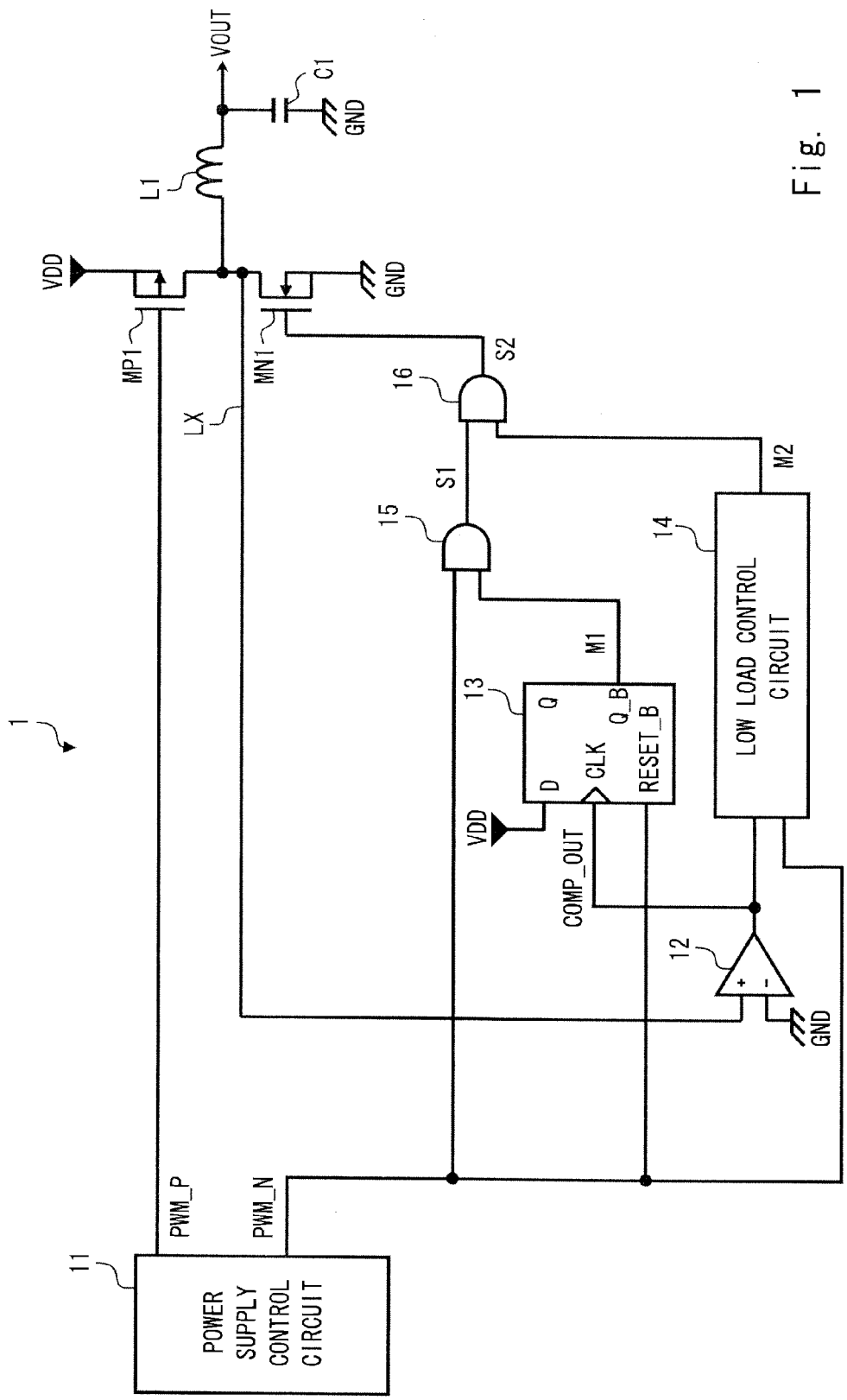
FIG. 1 is a block diagram showing a DC-DC converter according to an embodiment 1 of the present invention.

FIG. 1 is a block diagram showing a DC-DC converter 1 according to an embodiment 1 of the present invention. When detecting that a current is flowing backward (when detecting that a coil current has decreased to a value near 0), the DC-DC converter 1 according to the embodiment stops the current backflow by turning off a rectification transistor provided on a backflow path. As a result of it, increase of a consumption current is suppressed. Furthermore, when a timing (backflow detection timing) of having detected the current backflow in a certain cycle is the same as or earlier than a previously decided reference timing, the DC-DC converter 1 according to the embodiment continues to keep the rectification transistor turned off during a next cycle. As a result of it, since the DC-DC converter 1 according to the embodiment can suppress useless switch control of the rectification transistor in a case of low load in which a backflow is likely to occur, it can further suppress the increase of the consumption current. Hereafter, explanation will be made specifically.

As shown in FIG. 1, the DC-DC converter 1 is provided with: a power supply control circuit 11; a comparator (a comparison circuit) 12; a flip-flop (a first flip-flop, and hereinafter simply referred to as a DFF) 13; a low load control circuit 14; an AND circuit (a first AND circuit) 15; an AND circuit (a second AND circuit, and hereinafter simply referred to as an AND) 16; an output transistor (a first switching element) MP1; a rectification transistor (a second switching element) MN1; a coil (an inductor) L1; and a capacitor C1. In the embodiment, a case will be explained as an example where the output transistor MP1 is a P-channel MOS transistor, and the rectification transistor MN1 is an N-channel MOS transistor. It is to be noted that a first control circuit includes the DFF 13 and the AND 15. In addition, a second control circuit includes the low load control circuit 14 and the AND 16.

The power supply control circuit 11 is the circuit that continuously generates a pulse signal (a first pulse signal) PWM_P and a pulse signal (a second pulse signal) PWM_N that have a predetermined duty ratio. The power supply control circuit 11 can appropriately change the duty ratio of the pulse signals PWM_P and PWM_N. It is to be noted that the duty ratio is a percentage of an H level in one cycle of a pulse signal of voltage levels of the H level and an L level.

The output transistor MP1 and the rectification transistor MN1 are connected in series between an input voltage terminal (hereinafter a terminal name is referred to as a VDD) to which a power supply voltage (an input voltage) VDD is supplied, and a reference voltage terminal (hereinafter a terminal name is referred to as a GND) to which a reference voltage (a first reference voltage) GND is supplied. More specifically, in the output transistor MP1, a source is connected to the input voltage terminal VDD, a drain is connected to a node LX, and the pulse signal PWM_P from the power supply control circuit 11 is applied to a gate. In the rectification transistor MN1, a source is connected to the reference voltage terminal GND, a drain is connected to the node LX, and a control signal S2 (mentioned later) is applied to a gate.

The output transistor MP1 is turned on when the pulse signal PWM_P is at the L level, and is turned off when the pulse signal PWM_P is at the H level. The rectification transistor MN1 is turned on when the control signal S2 is at the H level, and is turned off when the control signal S2 is at the L level. It is to be noted that in a normal state (a state where a current backflow does not occur), the output transistor MP1 and the rectification transistor MN1 are controlled to be turned on and off so as to be opposite to each other.

The coil L1 is provided between the node LX and an external output terminal VOUT. In addition, the capacitor C1 is provided between a connection point between the coil L1 and the external output terminal VOUT, and the reference voltage terminal GND.

For example, when the output transistor MP1 is turned on, and the rectification transistor MN1 is turned off, a current flows toward the coil L1 through the output transistor MP1 from the input voltage terminal VDD, and the capacitor C1 is charged. As a result of it, a current flowing in the coil L1 increases, and energy is stored in the coil L1.

Meanwhile, when the output transistor MP1 is turned off, and the rectification transistor MN1 is turned on, the energy stored in the coil L1 is released, the current flows toward the coil L1 through the rectification transistor MN1, and the capacitor C1 is charged. The current flowing in the coil L1 decreases in the meantime. It is to be noted that when the current is flowing toward the coil L1 through the rectification transistor MN1, a voltage of the node LX indicates a value lower than the reference voltage GND. Meanwhile, when the current flowing in the coil L1 decreases, and the current begins to flow through the rectification transistor MN1 from the coil L1, i.e., when a current backflow occurs, the voltage of the node LX indicates a value not less than the reference voltage GND.

In the comparator 12, the voltage of the node LX is supplied to a non-inversion input terminal, a reference voltage (a second reference voltage) GND is supplied to an inversion input terminal, and a comparison result COMP_OUT is output from an output terminal. That is, the comparator 12 is a circuit that compares the voltage of the node LX with the reference voltage GND, and outputs the comparison result COMP_OUT.

For example, when the voltage of the node LX is lower than the reference voltage GND, the comparator 12 outputs the comparison result COMP_OUT of the L level. Meanwhile, when the voltage of the node LX is not less than the reference voltage GND, the comparator 12 outputs the comparison result COMP_OUT of the H level.

In the DFF 13, the comparison result COMP_OUT is input to a clock input terminal CLK, the power supply voltage VDD (H level) is input to a data input terminal D, the pulse signal PWM_N from the power supply control circuit 11 is input to a reset input terminal RESET_B, and a mask signal (a first mask signal) M1 is output from a data inversion output terminal Q_B.

The DFF 13 is reset when the pulse signal PWM_N is at the L level, and outputs the mask signal M1 of the H level from the data inversion output terminal Q_B. In addition, reset of the DFF 13 is released when the pulse signal PWM_N is at the H level, and when the comparison result COMP_OUT rises during this period, the DFF 13 outputs the mask signal M1 of the L level from the data inversion output terminal Q_B in synchronization with the rise of the comparison result COMP_OUT.

In the AND 15, the pulse signal PWM_N from the power supply control circuit 11 is input to one input terminal, the mask signal M1 from the DFF 13 is input to the other input terminal, and a control signal (a first control signal) S1 is output from an output terminal. That is, the AND 15 is a circuit that controls whether to output the pulse signal PWM_N from the power supply control circuit 11 as it is as the control signal S1, based on the mask signal M1.

For example, when the mask signal M1 is at the H level, the AND 15 outputs the pulse signal PWM_N from the power supply control circuit 11 as it is as the control signal S1. Meanwhile, when the mask signal M1 is at the L level, the AND 15 outputs the control signal S1 (a first stop signal) of the L level regardless of a value of the pulse signal PWM_N.

The low load control circuit 14 is the circuit that generates a mask signal (a second mask signal) M2 based on a timing (a backflow detection timing) when a current backflow has been detected by the comparison result COMP_OUT, and the previously decided reference timing. Specifically, when in a certain cycle, a switching timing from the L level to the H level of the comparison result COMP_OUT is later than a reference timing during both the pulse signals PWM_P and PWM_N being at the H level, the low load control circuit 14 continues to output the mask signal M2 of the H level during a next cycle. Similarly, when in a certain cycle, the comparison result COMP_OUT remains at the L level during both the pulse signals PWM_P and PWM_N being at the H level, the low load control circuit 14 continues to output the mask signal M2 of the H level during a next cycle. Meanwhile, when in a certain cycle, a switching timing from the L level to the H level of the comparison result COMP_OUT is the same as or earlier than a reference timing during both the pulse signals PWM_P and PWM_N being at the H level, the low load control circuit 14 continues to output the mask signal M2 of the L level during a next cycle.

In the AND 16, the control signal S1 from the AND 15 is input to one input terminal, the mask signal M2 from the low load control circuit 14 is input to the other input terminal, and a control signal (a second control signal) S2 is output from an output terminal. That is, the AND 16 is a circuit that controls whether to output the control signal S1 from the AND 15 as it is as the control signal S2, based on the mask signal M2.

For example, when the mask signal M2 is at the H level, the AND 16 outputs the control signal S1 from the AND 15 as it is as the control signal S2. Meanwhile, when the mask signal M2 is at the L level, the AND 16 outputs the control signal S2 (a second stop signal) of the L level regardless of a value of the control signal S1.

As described above, when the current backflow is detected by the comparator 12, the DC-DC converter 1 shown in FIG. 1 stops the current backflow by turning off the rectification transistor MN1. As a result of it, increase of the consumption current is suppressed. Furthermore, when in a certain cycle, a timing of having detected the current backflow is the same as or earlier than a reference timing, i.e., when the current backflow is detected at a comparatively early timing, the DC-DC converter 1 shown in FIG. 1 continues to keep the rectification transistor MN1 turned off during a next cycle. As a result of it, since the DC-DC converter 1 shown in FIG. 1 can suppress useless switch control of the rectification transistor MN1, it can further suppress the increase of the consumption current.

(Timing Chart)

Figure 3:
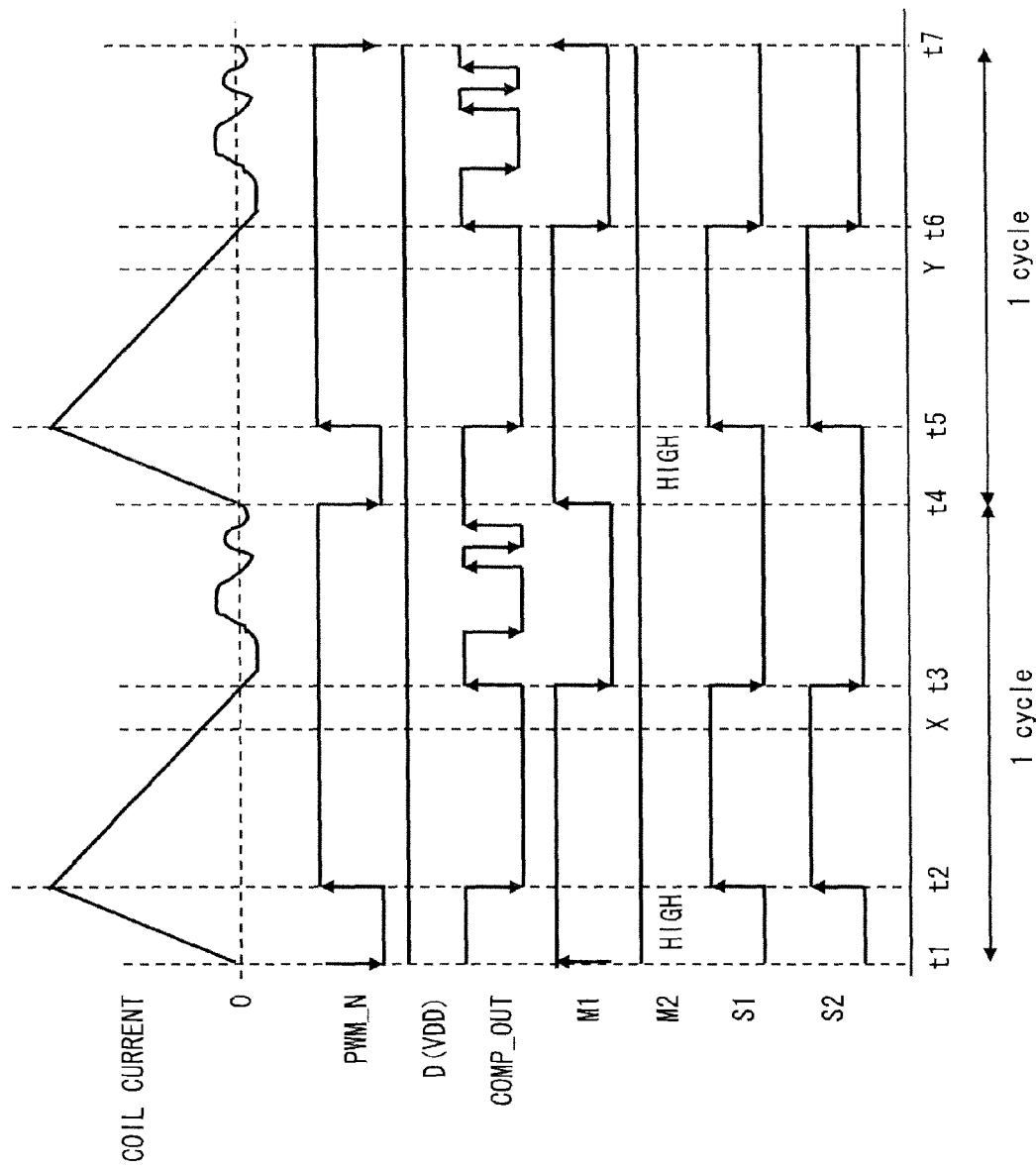
FIG. 3 is a timing chart showing operation of the DC-DC converter according to the embodiment 1 of the present invention.
Figure 4:
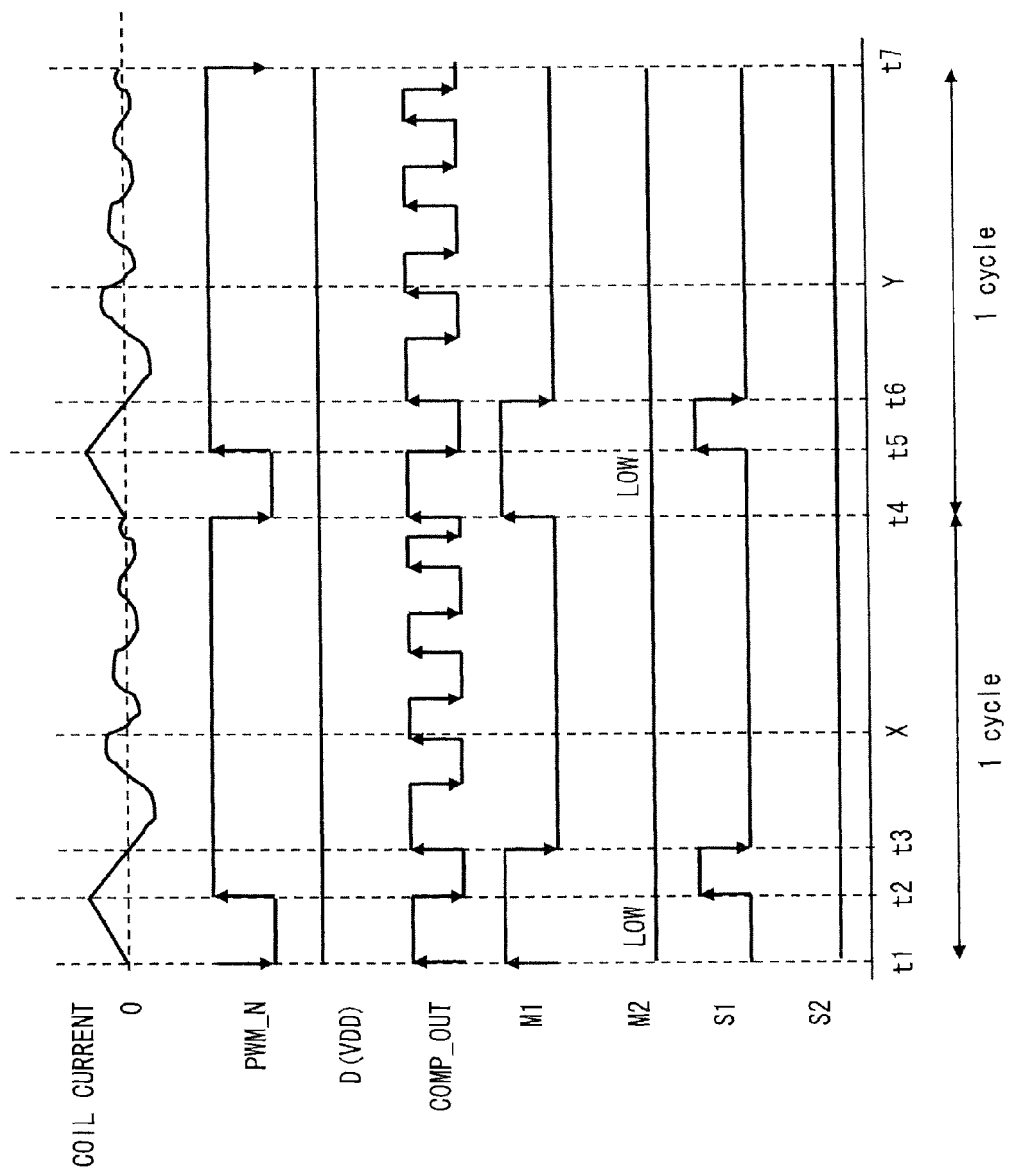
FIG. 4 is a timing chart showing operation of the DC-DC converter according to the embodiment 1 of the present invention.

Next, operation of the DC-DC converter 1 shown in FIG. 1 will be explained using timing charts of FIGS. 2 to 4. It is to be noted that a coil current shown in the timing charts of FIGS. 2 to 4 is the current flowing in the coil L1, and that a current flowing toward the external output terminal VOUT through the coil L1 from the node LX is set to be positive.

Figure 2:
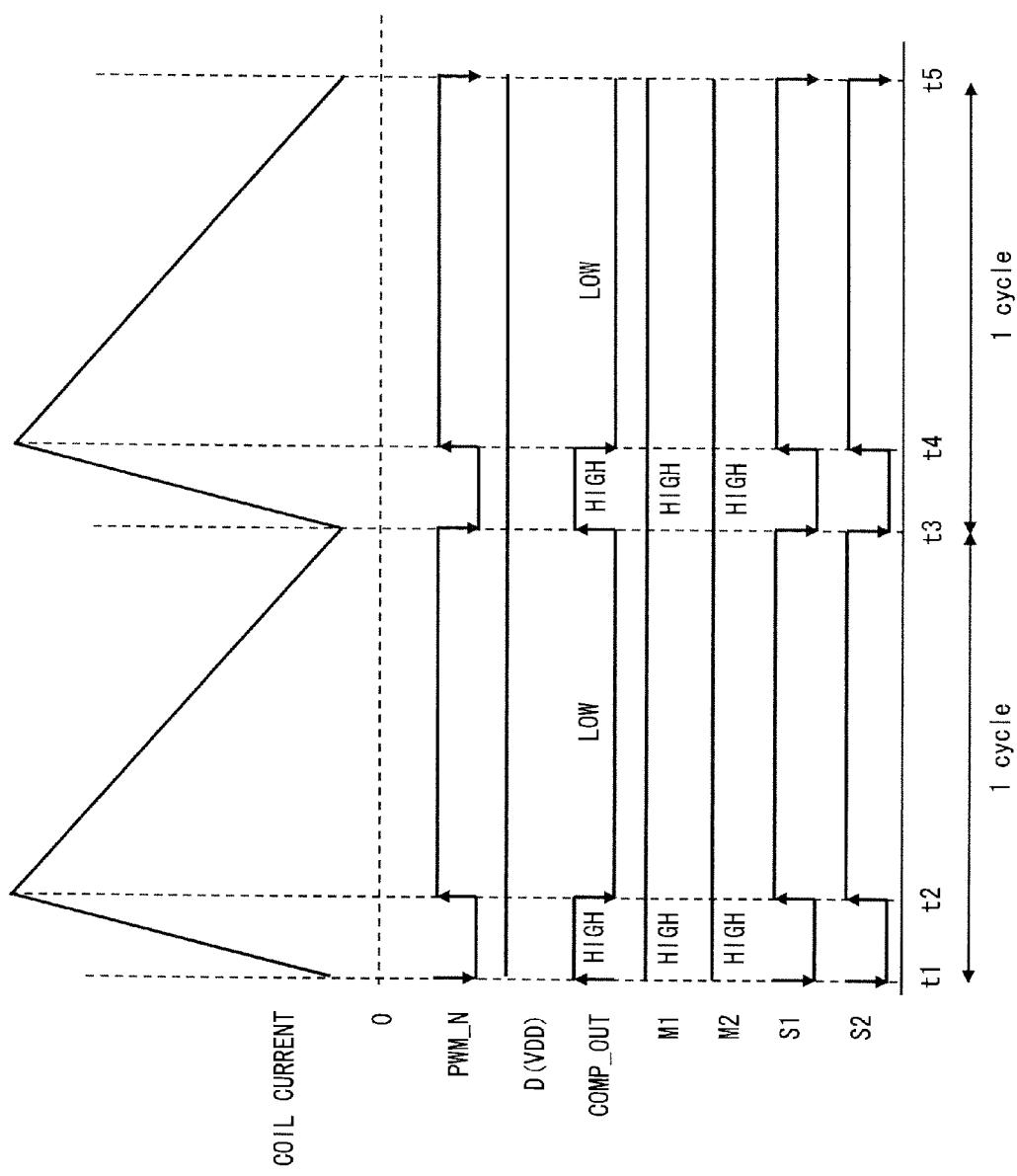
FIG. 2 is a timing chart showing operation of the DC-DC converter according to the embodiment 1 of the present invention.

FIG. 2 is the timing chart showing operation of the DC-DC converter 1 at the time of high load. It is to be noted that the high load means a state where much current needs to be supplied to a circuit (not shown) connected to the external output terminal VOUT.

As shown in FIG. 2, when the pulse signals PWM_N and PWM_P are at the L level (times t1 to t2 and times t3 to t4), the output transistor MP1 is turned on. At this time, the pulse signal PWM_N of the L level is propagated as it is as the control signal S2 through the ANDs 15 and 16 regardless of values of the mask signals M1 and M2. As a result of it, the rectification transistor MN1 is turned off. Therefore, the current flows toward the coil L1 through the output transistor MP1 from the input voltage terminal VDD, and the capacitor C1 is charged. As a result of it, the coil current flowing in the coil L1 increases, and energy is stored in the coil L1.

It is to be noted that since the voltage of the node LX is higher than the reference voltage GND during this period (the times t1 to t2 and the times t3 to t4), the comparator 12 outputs the comparison result COMP_OUT of the H level. However, since the DFF 13 has been reset by the pulse signal PWM_N of the L level, it outputs the mask signal M1 of the H level.

In addition, since a current backflow is not detected in a previous cycle (since the coil current has not decreased to a value near 0), the low load control circuit 14 continues to output the mask signal M2 of the H level during the cycle (the times t1 to t3 and times t3 to t5).

Next, when the pulse signals PWM_N and PWM_P are switched from the L level to the H level (the times t2 and t4), the output transistor MP1 is turned off. At this time, since the mask signals M1 and M2 are at the H level, the pulse signal PWM_N of the H level is propagated as it is as the control signal S2 through the ANDs 15 and 16. As a result of it, the rectification transistor MN1 is turned on. Therefore, the energy stored in the coil L1 is released, the current flows toward the coil L1 through the rectification transistor MN1, and the capacitor C1 is charged. The current flowing in the coil L1 decreases in the meantime.

It is to be noted that when the current is flowing toward the coil L1 through the rectification transistor MN1, the voltage of the node LX indicates a value lower than the reference voltage GND. In this case, the comparator 12 outputs the comparison result COMP_OUT of the L level. Therefore, the DFF 13 outputs the mask signal M1 of the H level at the time of reset.

Here, since the energy stored in the coil L1 is large in an example of high load of FIG. 2, the coil current does not decrease to a negative value although it decreases during both the pulse signals PWM_N and PWM_P being at the H level (times t2 to t3 and the times t4 to t5). That is, the current backflow has not occurred. In other words, the voltage of the node LX always indicates a value lower than the reference voltage GND during both the pulse signals PWM_P and PWM_N being at the H level. Accordingly, the comparator 12 continues to output the comparison result COMP_OUT of the L level during this period. Therefore, the DFF 13 continues to output the mask signal M1 of the H level at the time of reset during this period. In addition, the low load control circuit 14 continues to output the mask signal M2 of the H level during the cycle as described above. Accordingly, the pulse signal PWM_N is propagated as it is as the control signal S2 through the ANDs 15 and 16.

At the time of high load as described above, although the current (coil current) flowing in the coil L1 repeats increase and decrease, a direction of the current does not change. That is, the DC-DC converter 1 according to the embodiment performs similar operation to a common DC-DC converter at the time of high load.

FIG. 3 is the timing chart showing operation of the DC-DC converter 1 at the time of middle load (when a timing of occurrence of the current backflow is late). It is to be noted that the middle load means a state where less current than the case of high load needs to be supplied to the circuit (not shown) connected to the external output terminal VOUT.

As shown in FIG. 3, when the pulse signals PWM_N and PWM_P are at the L level (times t1 to t2 and times t4 to t5), the output transistor MP1 is turned on. At this time, the pulse signal PWM_N of the L level is propagated as it is as the control signal S2 through the ANDs 15 and 16 regardless of the values of the mask signals M1 and M2. As a result of it, the rectification transistor MN1 is turned off. Therefore, a current flows toward the coil L1 through the output transistor MP1 from the input voltage terminal VDD, and the capacitor C1 is charged. As a result of it, the coil current flowing in the coil L1 increases, and energy is stored in the coil L1.

It is to be noted that since the voltage of the node LX is higher than the reference voltage GND during this period (the times t1 to t2 and the times t4 to t5), the comparator 12 outputs the comparison result COMP_OUT of the H level. However, since the DFF 13 has been reset by the pulse signal PWM_N of the L level, it outputs the mask signal M1 of the H level.

In addition, since the current backflow has been detected at a timing later than the previously decided reference timing in the previous cycle (since the coil current has decreased to a value near 0), the low load control circuit 14 continues to output the mask signal M2 of the H level during the cycle (the times t1 to t4 and times t4 to t7).

Next, when the pulse signals PWM_N and PWM_P are switched from the L level to the H level (the times t2 and t5), the output transistor MP1 is turned off. At this time, since the mask signals M1 and M2 are at the H level, the pulse signal PWM_N of the H level is propagated as it is as the control signal S2 through the ANDs 15 and 16. As a result of it, the rectification transistor MN1 is turned on. Therefore, energy stored in the coil L1 is released, the current flows toward the coil L1 through the rectification transistor MN1, and the capacitor C1 is charged. The current flowing in the coil L1 decreases in the meantime.

It is to be noted that when the current flows toward the coil L1 through the rectification transistor MN1, the voltage of the node LX indicates a value lower than the reference voltage GND. In this case, the comparator 12 outputs the comparison result COMP_OUT of the L level. Therefore, the DFF 13 outputs the mask signal M1 of the H level at the time of reset.

Here, since the energy stored in the coil L1 is smaller than in the case of high load in an example of middle load of FIG. 3, the coil current decreases to a negative value (times t3 and t6) during both the pulse signals PWM_N and PWM_P being at the H level (the times t2 to t4 and the times t5 to t7). That is, the current backflow occurs. In other words, the voltage of the node LX indicates a value not less than the reference voltage GND at the times t3 and t6. At this time, the comparator 12 switches the comparison result COMP_OUT from the L level to the H level, and outputs it. In synchronization with the rise of the comparison result COMP_OUT, the DFF 13 switches the mask signal M1 from the H level to the L level, and outputs it. Accordingly, the control signals S1 and S2 indicate the L level regardless of the value of the pulse signal PWM_N. As a result of it, since the rectification transistor MN1 is turned off, the current backflow stops.

In addition, since backflow detection timings (the times t3 and t6) are later than the reference timings (times X and Y) in the cycle (the times t1 to t4 and the times t4 to t7), the low load control circuit 14 continues to output the mask signal M2 of the H level during a next cycle.

At the time of middle load as described above, the current (coil current) flowing in the coil L1 flows backward. However, since the DC-DC converter 1 turns off the rectification transistor MN1 when the current backflow is detected, it can stop the current backflow. As a result of it, increase of the consumption current is suppressed. It is to be noted that since the backflow detection timing is later than the reference timing in the example of FIG. 3, the rectification transistor MN1 does not always continue to be off during the next cycle.

FIG. 4 is a timing chart showing operation of the DC-DC converter 1 at the time of low load (when the timing of occurrence of the current backflow is early). It is to be noted that the low load means a state where less current than the case of middle load needs to be supplied to the circuit (not shown) connected to the external output terminal VOUT.

As shown in FIG. 4, when the pulse signals PWM_N and PWM_P are at the L level (times t1 to t2 and times t4 to t5), the output transistor MP1 is turned on. At this time, the pulse signal PWM_N of the L level is propagated as it is as the control signal S2 through the ANDs 15 and 16 regardless of the values of the mask signals M1 and M2. As a result of it, the rectification transistor MN1 is turned off. Therefore, the current flows toward the coil L1 through the output transistor MP1 from the input voltage terminal VDD, and the capacitor C1 is charged. As a result of it, the coil current flowing in the coil L1 increases, and energy is stored in the coil L1.

It is to be noted that since the voltage of the node LX is higher than the reference voltage GND during this period (the times t1 to t2 and the times t4 to t5), the comparator 12 outputs the comparison result COMP_OUT of the H level. However, since the DFF 13 has been reset by the pulse signal PWM_N of the L level, it outputs the mask signal M1 of the H level.

In addition, since the current backflow has been detected at the same timing as or at a timing earlier than the previously decided reference timing in the previous cycle (since the coil current has decreased to a value near 0), the low load control circuit 14 continues to output the mask signal M2 of the L level during the cycle (the times t1 to t4 and the times t4 to t7).

Next, when the pulse signals PWM_N and PWM_P are switched from the L level to the H level (the times t2 and t5), the output transistor MP1 is turned off. At this time, since the mask signal M2 indicates the L level, the control signal S2 is at the L level. Accordingly, the rectification transistor MN1 is turned off regardless of the value of the pulse signal PWM_N. Therefore, the current backflow does not occur. However, in an example of FIG. 4, a case is also taken into consideration where a parasitic diode is formed in the rectification transistor MN1. That is, the energy stored in the coil L1 is released, the current flows toward the coil L1 through the parasitic diode of the rectification transistor MN1, and the capacitor C1 is charged. The current flowing in the coil L1 decreases in the meantime.

It is to be noted that when the current flows toward the coil L1 through the parasitic diode of the rectification transistor MN1, the voltage of the node LX indicates a value lower than the reference voltage GND. In this case, the comparator 12 outputs the comparison result COMP_OUT of the L level. Therefore, the DFF 13 outputs the mask signal M1 of the H level at the time of reset.

Here, since the energy stored in the coil L1 is even smaller than in the case of middle load in an example of low load of FIG. 4, the coil current decreases to a value near 0 (the times t3 and t6) at a timing earlier than the reference timings (the times X and Y) during both the pulse signals PWM_N and PWM_P being at the H level (times t2 to t4 and the times t5 to t7). In other words, the voltage of the node LX indicates a value not less than the reference voltage GND at the times t3 and t6. At this time, the comparator 12 switches the comparison result COMP_OUT from the L level to the H level, and outputs it. In synchronization with the rise of the comparison result COMP_OUT, the DFF 13 switches the mask signal M1 from the H level to the L level, and outputs it. It is to be noted that the low load control circuit 14 continues to output the mask signal M2 of the L level during the cycle as described above. Accordingly, the control signal S2 indicates the L level regardless of the value of the pulse signal PWM_N. As a result of it, since the rectification transistor MN1 always continues to be off during the cycle, useless switch control is suppressed, and increase of the consumption current is suppressed.

In addition, since backflow detection timings (the times t3 and t6) are the same as or earlier than the reference timings (times X and Y) in the cycle (the times t1 to t4 and the times t4 to t7), the low load control circuit 14 continues to output the mask signal M2 of the L level during the next cycle.

At the time of low load as described above, the current (coil current) flowing in the coil L1 decreases to the value near 0 at the timing earlier than the reference timing. In this case, the DC-DC converter 1 stops the current backflow and suppresses useless switch control by continuing to keep the rectification transistor MN1 turned off during the next cycle. As a result of it, increase of the consumption current is further suppressed at the time of low load in which the current backflow is likely to occur.

(Configuration Example of Low Load Control Circuit 14)

Figure 5:
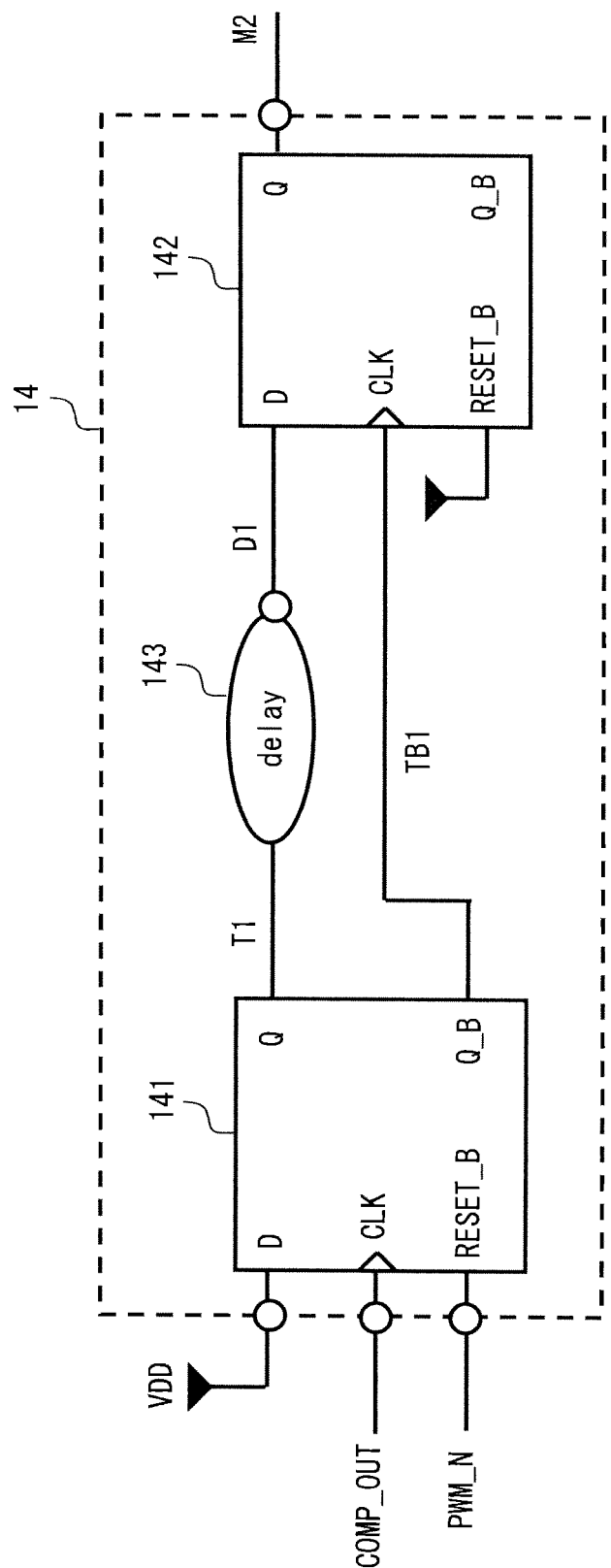
FIG. 5 is a block diagram showing a low load control circuit according to the embodiment 1 of the present invention.

FIG. 5 is a diagram showing a specific circuit configuration of the low load control circuit 14. As shown in FIG. 5, the low load control circuit 14 has: a DFF (a second flip-flop) 141; a DFF (a third flip-flop) 142, and a delay circuit 143.

In the DFF 141, the comparison result COMP_OUT is input to the clock input terminal CLK, the power supply voltage VDD (H level) is input to the data input terminal D, the pulse signal PWM_N from the power supply control circuit 11 is input to the reset input terminal RESET_B, an intermediate signal T1 is output from a data output terminal Q, and an intermediate inversion signal TB1 is output from the data inversion output terminal Q_B. In the delay circuit 143, the intermediate signal T1 is input to an input terminal, and a delay signal D1 is output from an output terminal. In the DFF 143 DFF 142, the intermediate inversion signal TB1 is input to the clock input terminal CLK from the DFF 141, the delay signal D1 from the delay circuit 143 is input to the data input terminal D, the power supply voltage VDD (H level) is input to the reset input terminal RESET_B, and the mask signal M2 is output from the data output terminal Q.

The DFF 141 is reset when the pulse signal PWM_N is at the L level, outputs the intermediate signal T1 of the L level from the data output terminal Q, and outputs the intermediate inversion signal TB1 of the H level from the data inversion output terminal Q_B. In addition, reset of the DFF 141 is released when the pulse signal PWM_N is at the H level, and when the comparison result COMP_OUT rises during this period, in synchronization with the rise of the comparison result COMP_OUT, the DFF 141 outputs the intermediate signal T1 of the H level from the data output terminal Q, and outputs the intermediate inversion signal TB1 of the L level from the data inversion output terminal Q_B.

The delay circuit 143 adds a predetermined delay to the intermediate signal T1 and inverts it, and outputs it as the delay signal D1. The DFF 142 takes in the delay signal D1 in synchronization with the rise of the intermediate inversion signal TB1, and outputs it as the mask signal M2.

(Timing Chart of Low Load Control Circuit 14)

Next, operation of the low load control circuit 14 shown in FIG. 5 will be explained using timing charts of FIGS. 6 to 8.

Figure 6:
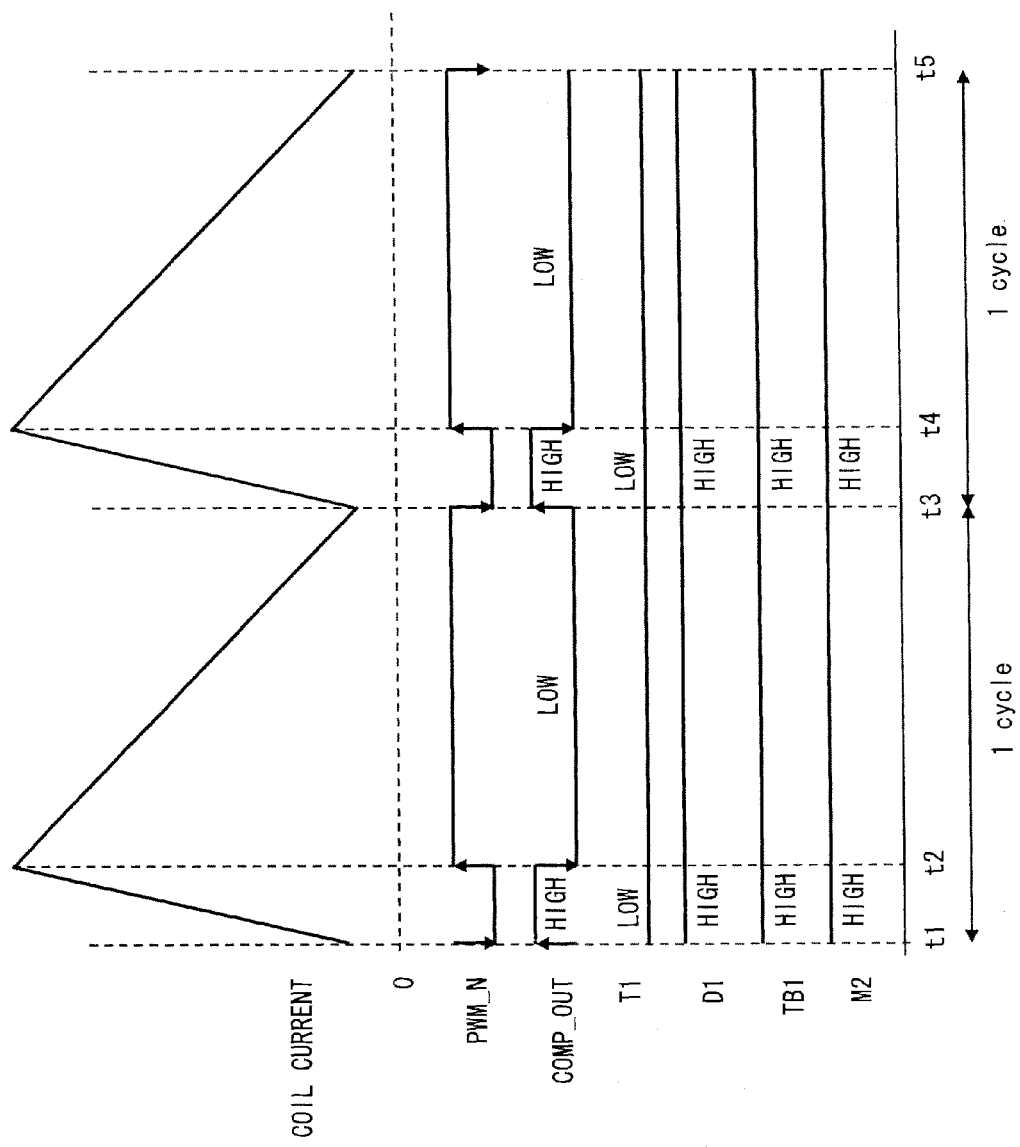
FIG. 6 is a timing chart showing operation of the low load control circuit according to the embodiment 1 of the present invention.

FIG. 6 is the timing chart showing operation of the low load control circuit 14 at the time of high load. It is to be noted that the timing chart shown in FIG. 6 shows operation of the low load control circuit 14 when the DC-DC converter 1 is made to operate on the same condition as FIG. 2.

As shown in FIG. 6, when the pulse signals PWM_N and PWM_P are at the L level, the comparator 12 outputs the comparison result COMP_OUT of the H level (times t1 to t2 and times t3 to t4). However, since the DFF 141 has been reset by the pulse signal PWM_N of the L level, it outputs the intermediate signal T1 of the L level, and outputs the intermediate inversion signal TB1 of the H level.

It is to be noted that since the current backflow is not detected in a previous cycle (since the coil current has not decreased to a value near 0), the DFF 142 continues to output the mask signal M2 of the H level at the time of reset during the cycle (the times t1 to t3 and times t3 to t5). Details will be mentioned later.

Next, when the pulse signals PWM_N and PWM_P are switched from the L level to the H level (the times t2 and t4), the comparator 12 outputs the comparison result COMP_OUT of the L level.

Here, since energy stored in the coil L1 is large in an example of high load of FIG. 6, the coil current does not decrease to a negative value although it decreases during both the pulse signals PWM_N and PWM_P being at the H level (times t2 to t3 and the times t4 to t5). That is, the current backflow has not occurred. In other words, the voltage of the node LX always indicates a value lower than the reference voltage GND during both the pulse signals PWM_P and PWM_N being at the H level. Accordingly, the comparator 12 continues to output the comparison result COMP_OUT of the L level during this period. Therefore, the DFF 141 continues to output the intermediate signal T1 of the L level and the intermediate inversion signal TB1 of the H level at the time of reset during this period. In response to that, the delay circuit 143 outputs the delay signal D1 of the H level. Therefore, the DFF 142 continues to output the mask signal M2 of the H level at the time of reset during a next cycle.

As described above, when the current backflow does not occur in a certain cycle, the low load control circuit 14 continues to output the mask signal M2 of the H level during a next cycle.

Figure 7:
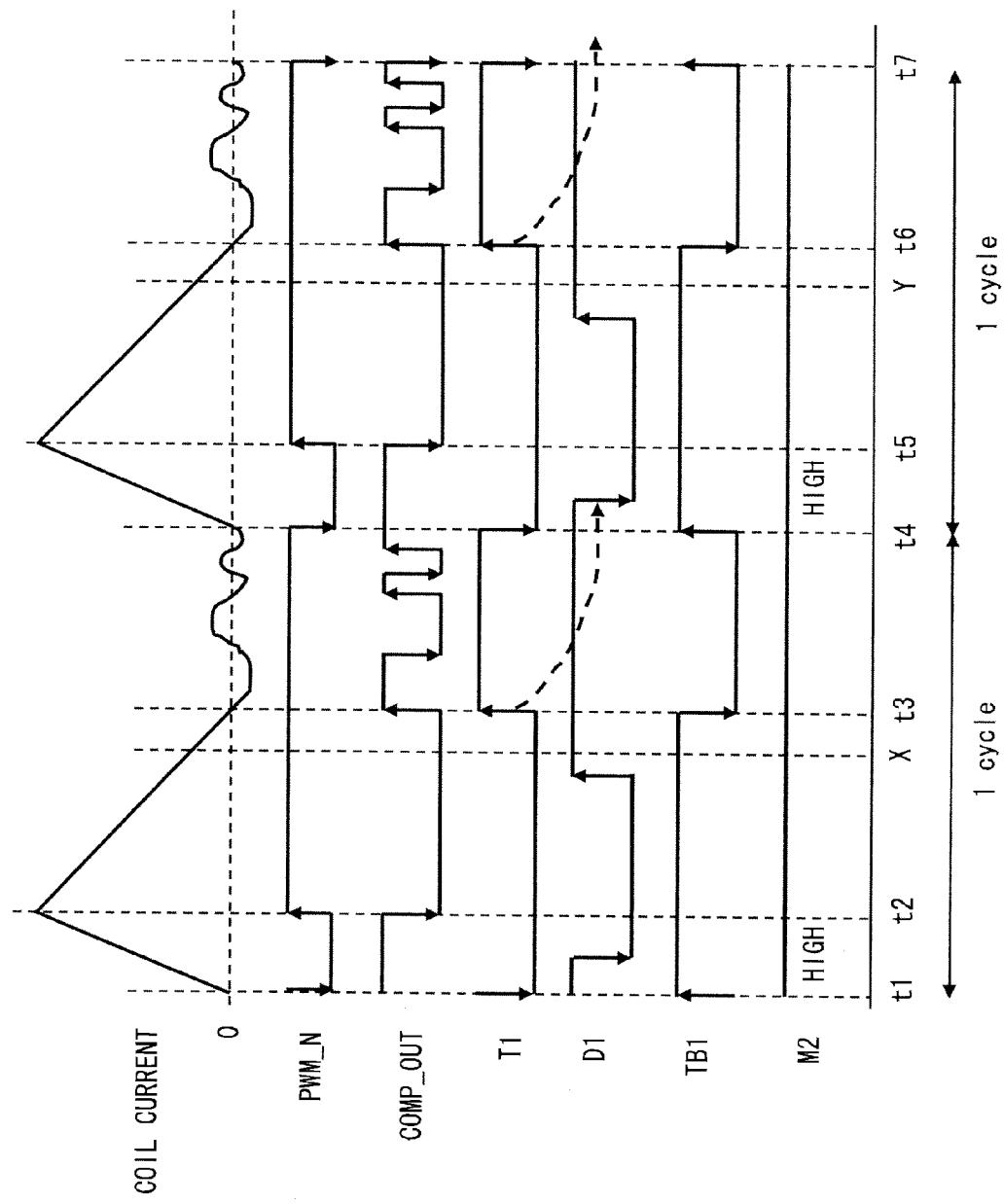
FIG. 7 is a timing chart showing operation of the low load control circuit according to the embodiment 1 of the present invention.

FIG. 7 is the timing chart showing operation of the low load control circuit 14 at the time of middle load. It is to be noted that the timing chart shown in FIG. 7 shows operation of the low load control circuit 14 when the DC-DC converter 1 is made to operate on the same condition as FIG. 3.

As shown in FIG. 7, when the pulse signals PWM_N and PWM_P are at the L level, the comparator 12 outputs the comparison result COMP_OUT of the H level (times t1 to t2 and times t4 to t5). However, since the DFF 141 has been reset by the pulse signal PWM_N of the L level, it outputs the intermediate signal T1 of the L level, and outputs the intermediate inversion signal TB1 of the H level.

It is to be noted that since the current backflow has been detected at a timing later than the previously decided reference timing in a previous cycle (since the coil current has decreased to a value near 0), the DFF 142 continues to output the mask signal M2 of the H level during the cycle (the times t1 to t4 and times t4 to t7). Details will be mentioned later.

Next, when the pulse signals PWM_N and PWM_P are switched from the L level to the H level (the times t2 and t5), the comparator 12 outputs the comparison result COMP_OUT of the L level.

Here, since energy stored in the coil L1 is smaller than in the case of high load in an example of middle load of FIG. 7, the coil current decreases to a negative value (times t3 and t6) during both the pulse signals PWM_N and PWM_P being at the H level (times t2 to t4 and the times t5 to t7). That is, the current backflow occurs. In other words, the voltage of the node LX indicates a value not less than the reference voltage GND at the times t3 and t6. At this time, the comparator 12 switches the comparison result COMP_OUT from the L level to the H level, and outputs it. In synchronization with the rise of the comparison result COMP_OUT, the DFF 141 switches the intermediate signal T1 from the L level to the H level and outputs it, and switches the intermediate inversion signal TB1 from the H level to the L level and outputs it.

Additionally, the delay circuit 143 adds a predetermined delay to the intermediate signal T1 and inverts it, and outputs it as the delay signal D1. Here, the delay circuit 143 adds to the intermediate signal T1 a delay of a length corresponding to the period between X and t4 and inverts the intermediate signal T1, and outputs it as the delay signal D1.

When the pulse signal PWM_N is switched from the H level to the L level, and thereby the intermediate inversion signal TB1 is reset at the H level (the times t4 and t7), the DFF 142 takes in the delay signal D1 in synchronization with the rise of the intermediate inversion signal TB1. Here, since backflow detection timings (the times t3 and t6) are later than the reference timings (times X and Y), the DFF 142 takes in the delay signal D1 in an H level state, and outputs it as the mask signal M2. That is, the DFF 142 continues to output the mask signal M2 of the H level during a next cycle.

As described above, when a backflow detection timing is later than a reference timing in a certain cycle, the low load control circuit 14 continues to output the mask signal M2 of the H level during a next cycle.

Figure 8:
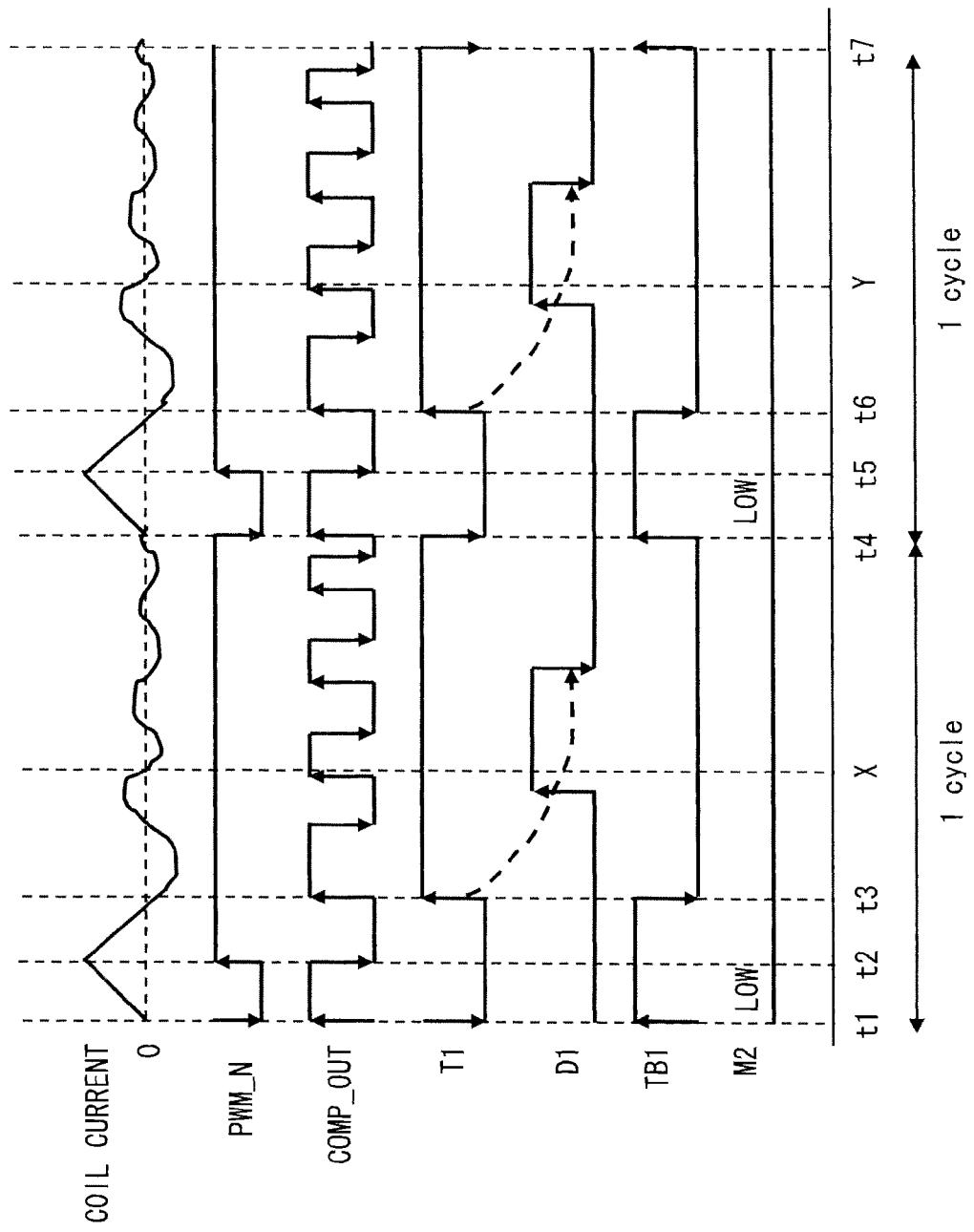
FIG. 8 is a timing chart showing operation of the low load control circuit according to the embodiment 1 of the present invention.

FIG. 8 is the timing chart showing operation of the low load control circuit 14 at the time of low load. It is to be noted that the timing chart shown in FIG. 8 shows operation of the low load control circuit 14 when the DC-DC converter 1 is made to operate on the same condition as FIG. 4.

As shown in FIG. 8, when the pulse signals PWM_N and PWM_P are at the L level, the comparator 12 outputs the comparison result COMP_OUT of the H level (times t1 to t2 and times t4 to t5). However, since the DFF 141 has been reset by the pulse signal PWM_N of the L level, it outputs the intermediate signal T1 of the L level, and outputs the intermediate inversion signal TB1 of the H level.

It is to be noted that since the current backflow has been detected at the same timing as or at a timing earlier than the previously decided reference timing in a previous cycle (since the coil current has decreased to a value near 0), the DFF 142 continues to output the mask signal M2 of the L level during the cycle (the times t1 to t4 and times t4 to t7).
Details will be mentioned later.

Next, when the pulse signals PWM_N and PWM_P are switched from the L level to the H level (the times t2 and t5), the comparator 12 outputs the comparison result COMP_OUT of the L level.

Here, since energy stored in the coil L1 is even smaller than in the case of middle load in an example of low load of FIG. 8, the coil current decreases to a value near 0 (the times t3 and t6) at a timing earlier than the reference timing (the times X and Y) during both the pulse signals PWM_N and PWM_P being at the H level (times t2 to t4 and the times t5 to t7). In other words, the voltage of the node LX indicates a value not less than the reference voltage GND at the times t3 and t6. At this time, the comparator 12 switches the comparison result COMP_OUT from the L level to the H level, and outputs it. In synchronization with the rise of the comparison result COMP_OUT, the DFF 141 switches the intermediate signal T1 from the L level to the H level and outputs it, and switches the intermediate inversion signal TB1 from the H level to the L level and outputs it.

Additionally, the delay circuit 143 adds a predetermined delay to the intermediate signal T1 and inverts it, and outputs it as the delay signal D1. Here, the delay circuit 142 adds to the intermediate signal T1 a delay of a length corresponding to the period between X and t4 and inverts the intermediate signal T1, and outputs it as the delay signal D1.

When the pulse signal PWM_N is switched from the H level to the L level, and thereby the intermediate inversion signal TB1 is reset at the H level (the times t4 and t7), the DFF 142 takes in the delay signal D1 in synchronization with the rise of the intermediate inversion signal TB1. Here, since backflow detection timings (the times t3 and t6) are earlier than the reference timings (times X and Y), the DFF 142 takes in the delay signal D1 in an L level state, and outputs it as the mask signal M2. That is, the DFF 142 continues to output the mask signal M2 of the L level during a next cycle.

As described above, when a backflow detection timing is the same as or earlier than a reference timing in a certain cycle, the low load control circuit 14 continues to output the mask signal M2 of the L level during a next cycle.

As described above, when detecting the current backflow (when detecting that the coil current has decreased to the value near 0), the DC-DC converter 1 according to the embodiment stops the current backflow by turning off the rectification transistor provided on the backflow path. As a result of it, increase of the consumption current is suppressed. Furthermore, when in a certain cycle, a backflow detection timing is the same as or earlier than a reference timing, the DC-DC converter 1 according to the embodiment continues to keep the rectification transistor turned off during a next cycle. As a result of it, since the DC-DC converter 1 according to the embodiment can suppress useless switch control of the rectification transistor in the case of low load in which the backflow is likely to occur, it can further suppress the increase of the consumption current.

In the related art, how early a current backflow is detected, switch control for turning off a rectification transistor inevitably works. Accordingly, with the related art, increase of the consumption current by the switch control has not been able to be suppressed. Meanwhile, since the DC-DC converter 1 according to the embodiment can suppress useless switch control by previously turning off the rectification transistor in the case of low load in which the current backflow is likely to occur, it can further suppress the increase of the consumption current.

It is to be noted that the delay added to the intermediate signal T1 by the delay circuit 143 can be adjusted. In addition, the low load control circuit 14 can be achieved by a simple circuit configuration including the two DFF 141 and DFF 142, and the delay circuit 143. In addition, although in the embodiment, a case has been explained as an example where the low load control circuit 14 is applied to a step-down circuit, the present invention is not limited to this. It is also possible to apply the low load control circuit 14 to a step-up circuit, a step-up/step-down circuit, and a polarity inversion circuit without limiting to the step-down circuit.

Embodiment 2

Figure 9:
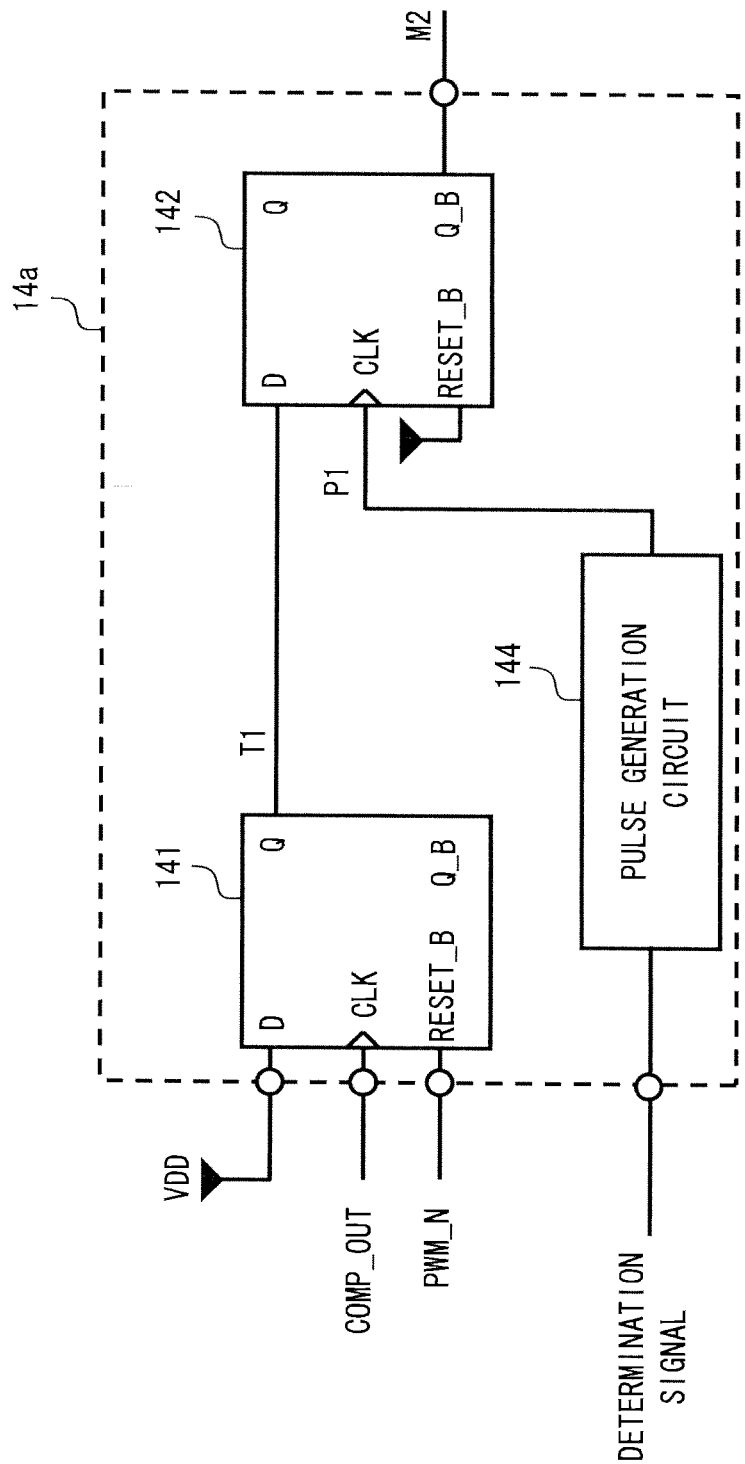
FIG. 9 is a block diagram showing a low load control circuit according to the embodiment 2 of the present invention.

In the embodiment, an other configuration example of the low load control circuit 14 will be explained as a low load control circuit 14a. FIG. 9 is a diagram showing a specific circuit configuration of the low load control circuit 14a. As shown in FIG. 9, the low load control circuit 14a has the DFF 141, the DFF 142, and a pulse generation circuit 144.

In the DFF 141, the comparison result COMP_OUT is input to the clock input terminal CLK, the power supply voltage VDD (H level) is input to the data input terminal D, the pulse signal PWM_N from the power supply control circuit 11 is input to the reset input terminal RESET_B, and the intermediate signal T1 is output from the data output terminal Q. In the pulse generation circuit 144, a determination signal is input to an input terminal, and a pulse signal (a third pulse signal) P1 is output from an output terminal. In the DFF 142, the pulse signal P1 from the pulse generation circuit 144 is input to the clock input terminal CLK, the intermediate signal T1 from the DFF 141 is input to the data input terminal D, the power supply voltage VDD (H level) is input to the reset input terminal RESET_B, and the mask signal M2 is output from the data inversion output terminal Q_B.

The DFF 141 is reset when the pulse signal PWM_N is at the L level, and outputs the intermediate signal T1 of the L level from the data output terminal Q. In addition, reset of the DFF 141 is released when the pulse signal PWM_N is at the H level, and when the comparison result COMP_OUT rises during this period, the DFF 141 outputs the intermediate signal T1 of the H level from the data output terminal Q in synchronization with the rise of the comparison result COMP_OUT.

The pulse generation circuit 144 outputs the pulse signal P1 with a predetermined cycle based on the determination signal output from the power supply control circuit 11. In the embodiment, a case will be explained as an example where the pulse signal P1 and the pulse signal PWM_N have the same cycle as each other, and have different duty ratios from each other. The DFF 142 takes in the intermediate signal T1 in synchronization with the rise of the pulse signal P1, and outputs an inversion signal of the intermediate signal T1 as the mask signal M2.

(Timing Chart of Low Load Control Circuit 14*a*)

Next, operation of the low load control circuit 14*a* shown in FIG. 9 will be explained using timing charts of FIGS. 10 to 12.

Figure 10:
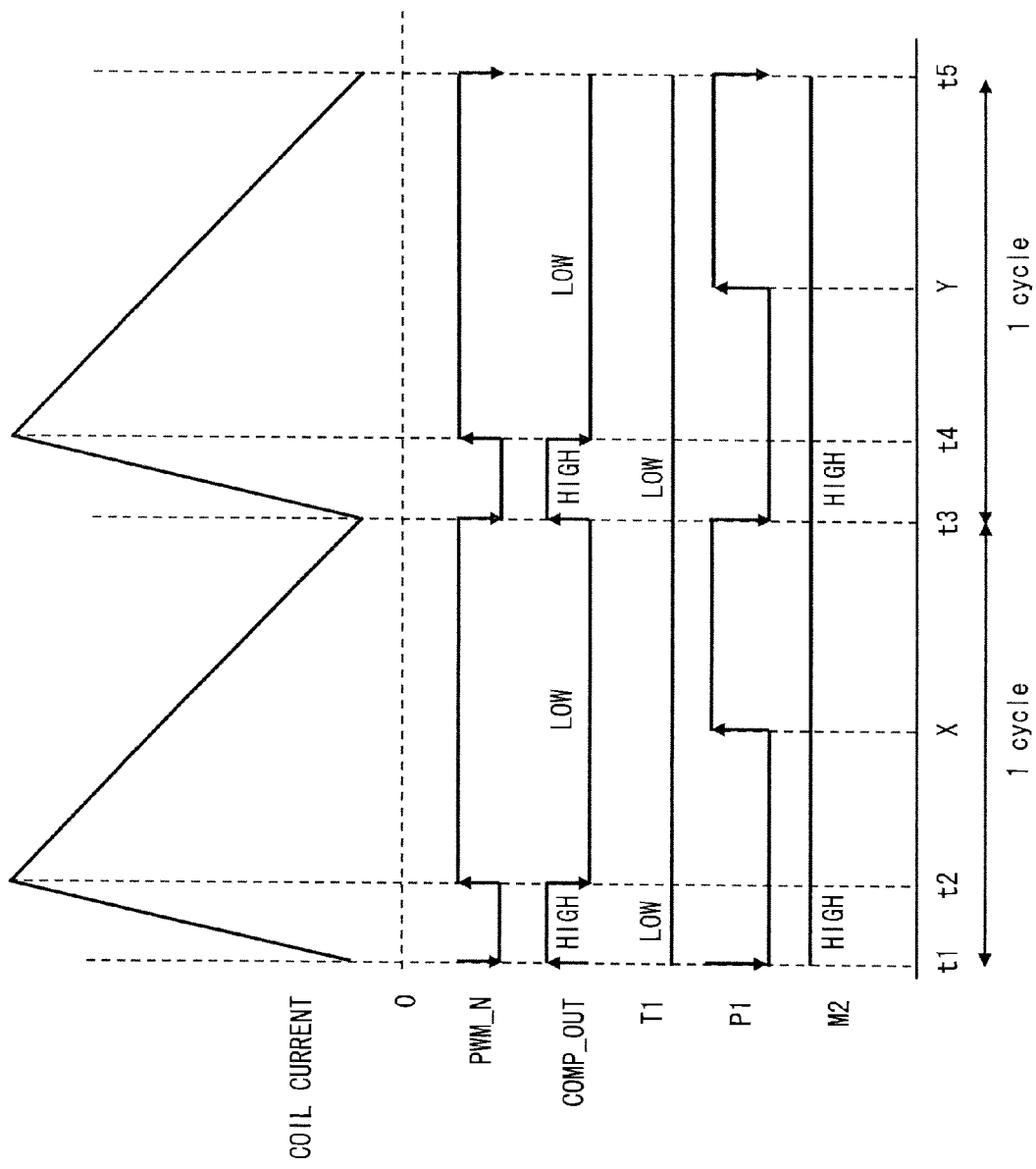
FIG. 10 is a timing chart showing operation of the low load control circuit according to the embodiment 2 of the present invention.

FIG. 10 is the timing chart showing operation of the low load control circuit 14*a* at the time of high load. It is to be noted that the timing chart shown in FIG. 10 shows operation of the low load control circuit 14*a* when the DC-DC converter 1 is made to operate on the same condition as FIG. 2.

As shown in FIG. 10, when the pulse signals PWM_N and PWM_P are at the L level, the comparator 12 outputs the comparison result COMP_OUT of the H level (times t1 to t2 and times t3 to t4). However, since the DFF 141 has been reset by the pulse signal PWM_N of the L level, it outputs the intermediate signal T1 of the L level.

Next, when the pulse signals PWM_N and PWM_P are switched from the L level to the H level (the times t2 and t4), the comparator 12 outputs the comparison result COMP_OUT of the L level.

Here, since energy stored in the coil L1 is large in an example of high load of FIG. 10, the coil current does not decrease to a negative value although it decreases during both the pulse signals PWM_N and PWM_P being at the H level (the times t2 to t3 and the times t4 to t5). That is, the current backflow has not occurred. In other words, the voltage of the node LX always indicates a value lower than the reference voltage GND during both the pulse signals PWM_P and PWM_N being at the H level. Accordingly, the comparator 12 continues to output the comparison result COMP_OUT of the L level during this period. Therefore, the DFF 141 continues to output the intermediate signal T1 of the L level at the time of reset during this period.

Meanwhile, the pulse generation circuit 144 falls in synchronization with the fall of the pulse signal PWM_N based on the determination signal from the power supply control circuit 11 (times t1 and t3), and rises at reference timings after the elapse of a predetermined period from the rise of the pulse signal PWM_N (the times X and Y).

Therefore, the DFF 142 takes in the intermediate signal T1 of the L level in synchronization with the rise of the pulse signal P1, and continues to output the mask signal M2 of the H level, which is the inversion signal, until the rise of the next pulse signal P1.

As described above, when the current backflow does not occur, the low load control circuit 14*a* continues to output the mask signal M2 of the H level.

Figure 11:
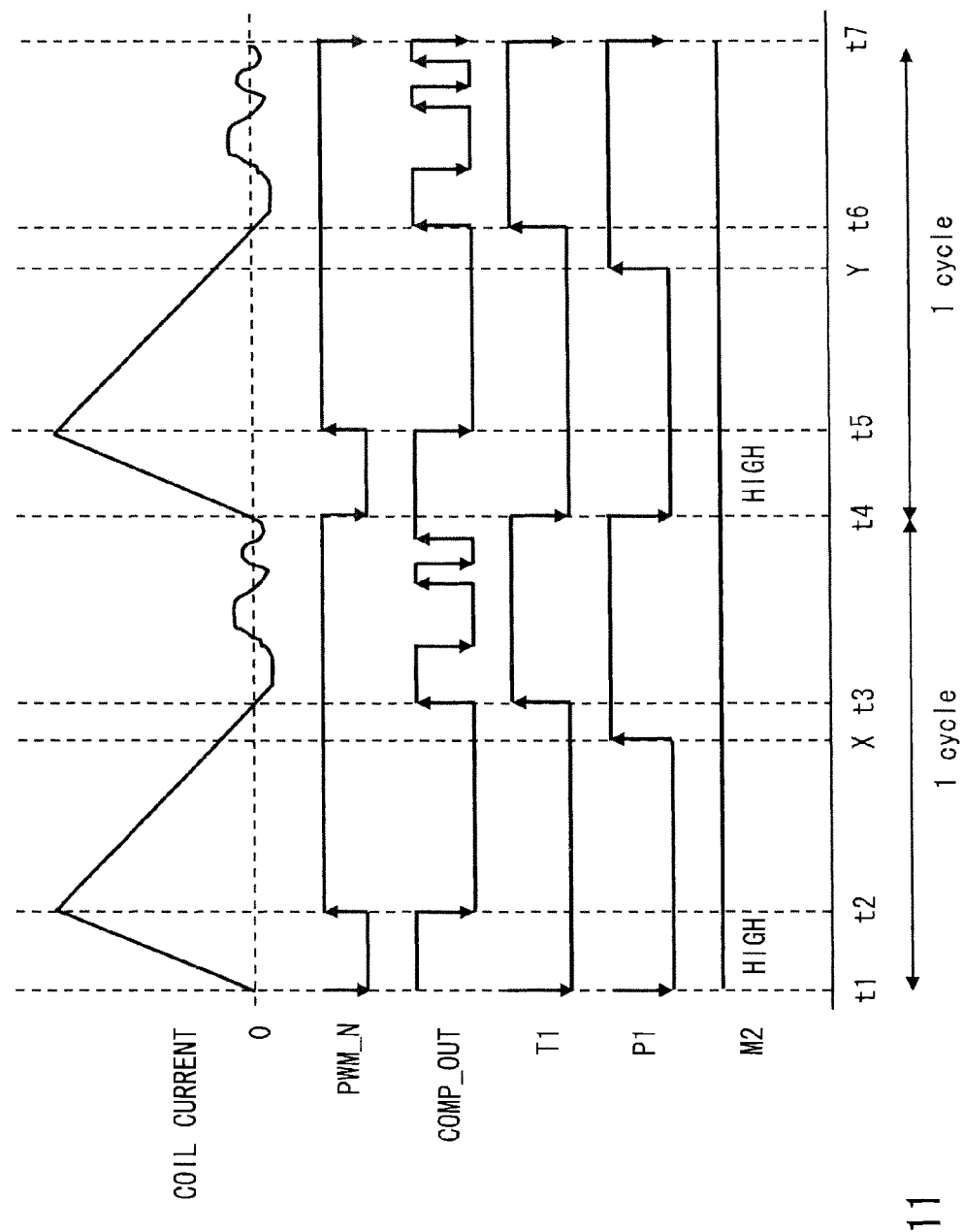
FIG. 11 is a timing chart showing operation of the low load control circuit according to the embodiment 2 of the present invention.

FIG. 11 is the timing chart showing operation of the low load control circuit 14*a* at the time of middle load. It is to be noted that the timing chart shown in FIG. 11 shows operation of the low load control circuit 14*a* when the DC-DC converter 1 is made to operate on the same condition as FIG. 3.

As shown in FIG. 11, when the pulse signals PWM_N and PWM_P are at the L level, the comparator 12 outputs the comparison result COMP_OUT of the H level (times t1 to t2 and times t4 to t5). However, since the DFF 141 has been reset by the pulse signal PWM_N of the L level, it outputs the intermediate signal T1 of the L level.

Next, when the pulse signals PWM_N and PWM_P are switched from the L level to the H level (the times t2 and t5), the comparator 12 outputs the comparison result COMP_OUT of the L level.

Here, since energy stored in the coil L1 is smaller than in the case of high load in an example of middle load of FIG. 11, the coil current decreases to a negative value (times t3 and t6) during both the pulse signals PWM_N and PWM_P being at the H level (times t2 to t4 and the times t5 to t7). That is, the current backflow occurs. In other words, the voltage of the node LX indicates a value not less than the reference voltage GND at the times t3 and t6. At this time, the comparator 12 switches the comparison result COMP_OUT from the L level to the H level, and outputs it. In synchronization with the rise of the comparison result COMP_OUT, the OFF 141 switches the intermediate signal T1 from the L level to the H level, and outputs it.

Meanwhile, the pulse generation circuit 144 falls in synchronization with the fall of the pulse signal PWM_N based on the determination signal from the power supply control circuit 11 (times t1 and t3), and rises at reference timings after the elapse of a predetermined period from the rise of the pulse signal PWM_N (the times X and Y).

Here, since backflow detection timings (the times t3 and t6) are later than the reference timings (times X and Y). Accordingly, the OFF 142 takes in the intermediate signal T1 of the L level in synchronization with the rise of the pulse signal P1, and continues to output the mask signal M2 of the H level, which is the inversion signal, until the rise of the next pulse signal P1.

As described above, when a backflow detection timing is later than a reference timing in a certain cycle, the low load control circuit 14*a* continues to output the mask signal M2 of the H level from the reference timing to a reference timing in a next cycle.

Figure 12:
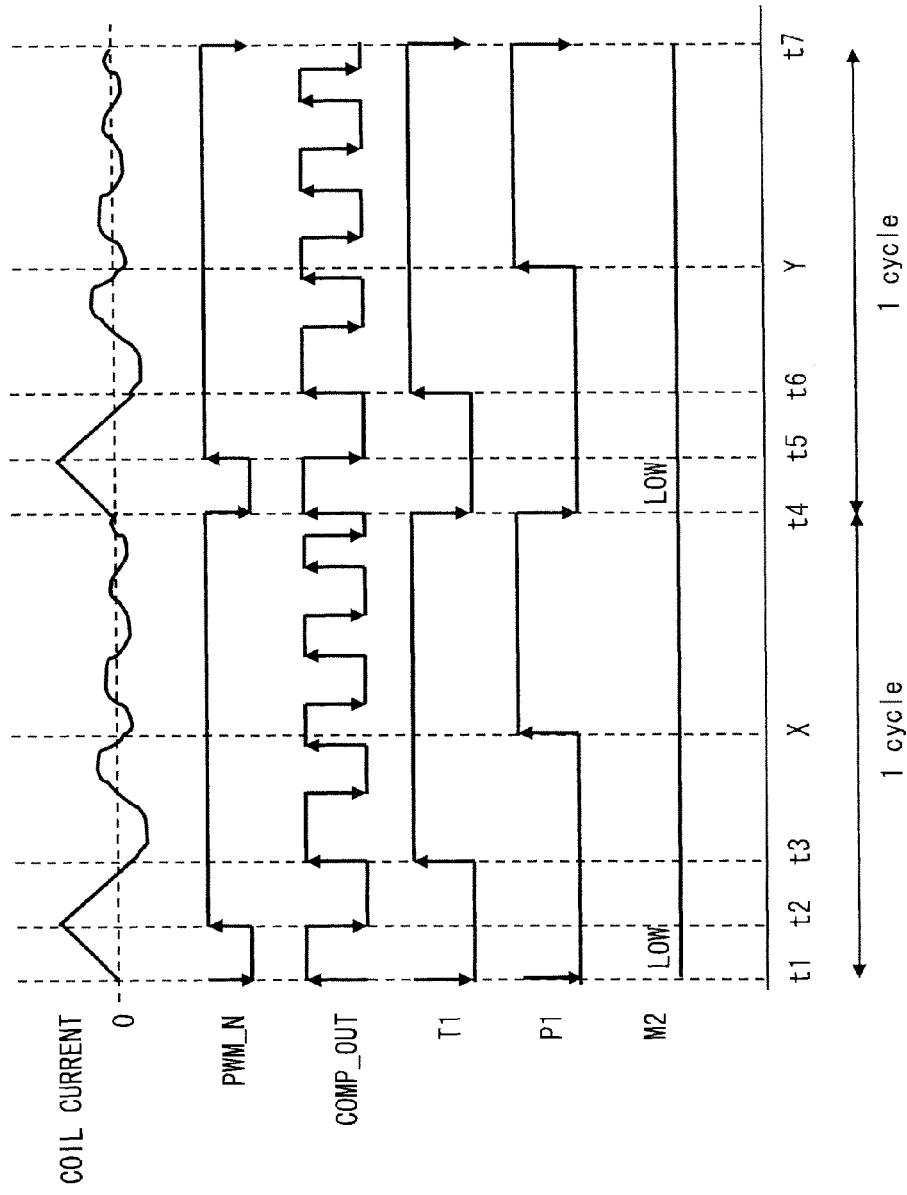
FIG. 12 is a timing chart showing operation of the low load control circuit according to the embodiment 2 of the present invention.
Figure 13:
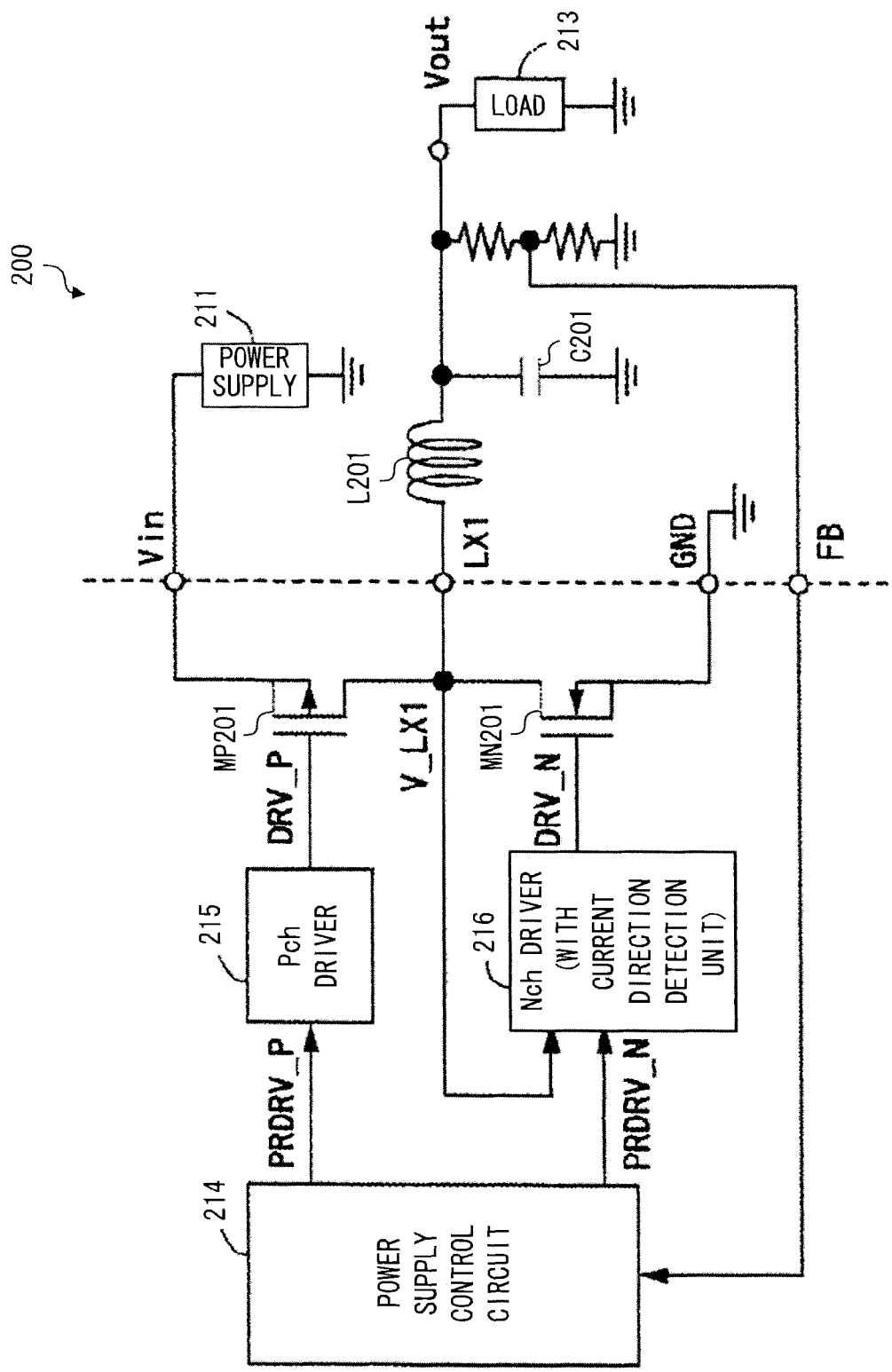
FIG. 13 is a block diagram showing a switching power supply apparatus of a related art.
Figure 14:
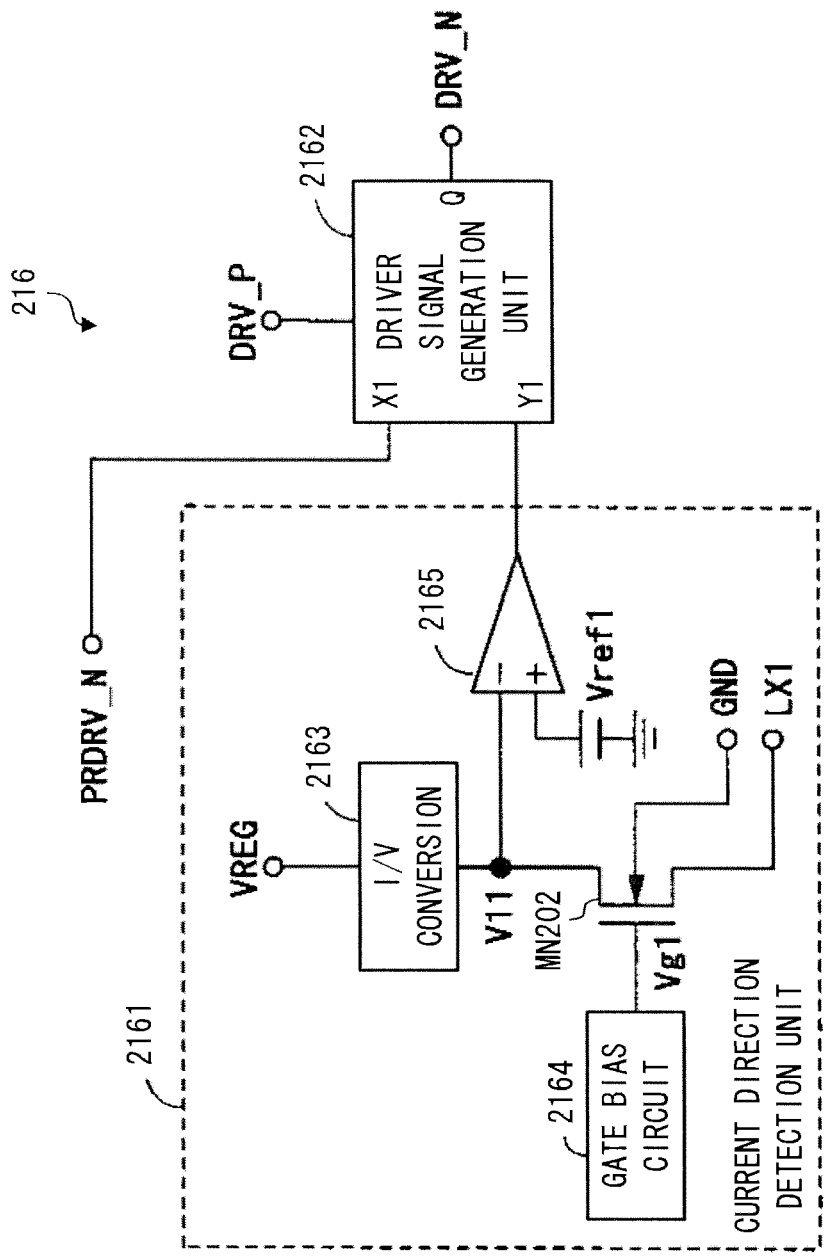
FIG. 14 is a block diagram showing a driver signal generation unit of an Nch driver of the related art.
Figure 15:
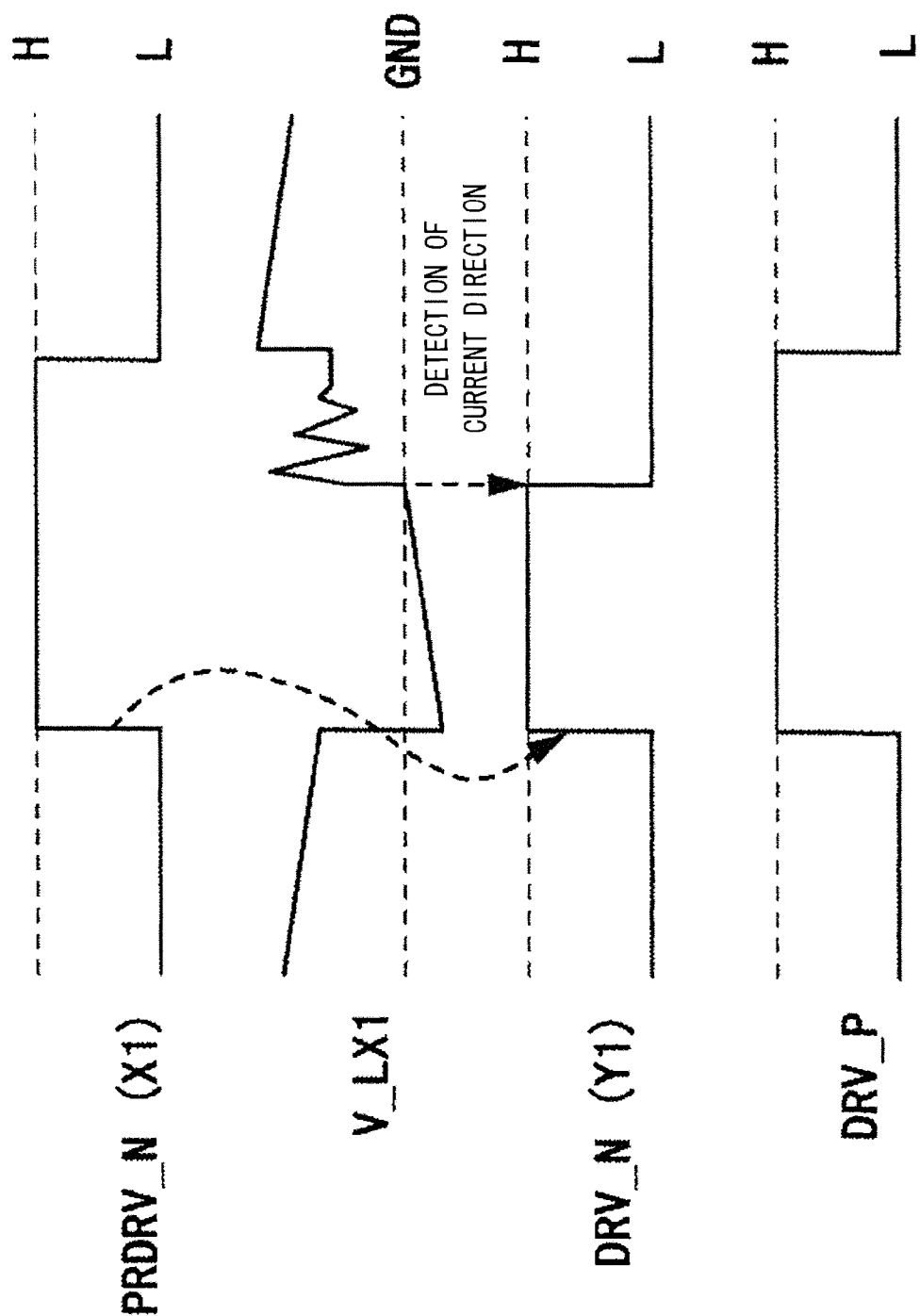
FIG. 15 is a timing chart showing operation of the switching power supply apparatus of the related art.

FIG. 12 is the timing chart showing operation of the low load control circuit 14*a* at the time of low load. It is to be noted that the timing chart shown in FIG. 12 shows operation of the low load control circuit 14*a* when the DC-DC converter 1 is made to operate on the same condition as FIG. 4.

As shown in FIG. 12, when the pulse signals PWM_N and PWM_P are at the L level, the comparator 12 outputs the comparison result COMP_OUT of the H level (times t1 to t2 and times t4 to t5). However, since the DFF 141 has been reset by the pulse signal PWM_N of the L level, it outputs the intermediate signal T1 of the L level.

Next, when the pulse signals PWM_N and PWM_P are switched from the L level to the H level (the times t2 and t5), the comparator 12 outputs the comparison result COMP_OUT of the L level.

Here, since energy stored in the coil L1 is even smaller than in the case of middle load in an example of low load of FIG. 12, the coil current decreases to a value near 0 (the times t3 and t6) at timings earlier than reference timings (the times X and Y) during both the pulse signals PWM_N and PWM_P being at the H level (times t2 to t4 and the times t5 to t7). In other words, the voltage of the node LX indicates a value not less than the reference voltage GND at the times t3 and t6. At this time, the comparator 12 switches the comparison result COMP_OUT from the L level to the H level, and outputs it. In synchronization with the rise of the comparison result COMP_OUT, the DFF 141 switches the intermediate signal T1 from the L level to the H level, and outputs it.

Meanwhile, the pulse generation circuit 144 falls in synchronization with the fall of the pulse signal PWM_N based on the determination signal from the power supply control circuit 11 (times t1 and t3), and rises at reference timings after the elapse of a predetermined period from the rise of the pulse signal PWM_N (the times X and Y).

Here, since backflow detection timings (the times t3 and t6) are earlier than the reference timings (times X and Y). Accordingly, the DFF 142 takes in the intermediate signal T1 of the H level in synchronization with the rise of the pulse signal P1, and continues to output the mask signal M2 of the L level, which is the inversion signal, until the rise of the next pulse signal P1.

As described above, when a backflow detection timing is the same as or earlier than a reference timing in a certain cycle, the low load control circuit 14a continues to output the mask signal M2 of the L level from the reference timing to a reference timing in a next cycle.

As described above, even in the case of the DC-DC converter 1 provided with the low load control circuit 14a according to the embodiment, a similar effect to the case of the embodiment 1 can be exerted.

As described above, when detecting the current backflow (when detecting that the coil current has decreased to the value near 0), the DC-DC converter 1 according to the embodiments 1 and 2 stops the current backflow by turning off the rectification transistor provided on the backflow path. As a result of it, increase of the consumption current is suppressed. Furthermore, when in a certain cycle, a backflow detection timing is the same as or earlier than a reference timing, the DC-DC converter 1 according to the embodiments 1 and 2 continues to keep the rectification transistor turned off during a next cycle. As a result of it, since the DC-DC converter according to the embodiment can suppress useless switch control of the rectification transistor in the case of low load in which the backflow is likely to occur, it can further suppress the increase of the consumption current.

It is to be noted that the present invention is not limited to the above-described embodiments, and appropriate change can be made without departing from the spirit of the invention. Although in the embodiment, the case has been explained as an example where the comparator 12 compares the voltage of the node LX with the reference voltage GND, the present invention is not limited to this. The comparator 12 can be appropriately changed to have a circuit configuration to compare the voltage of the node LX with the second reference voltage of a different voltage level from the reference voltage GND. In this case, even when a current does not necessarily flow backward, the comparator 12 determines a state near the backflow to be a state where "the current is flowing backward", and outputs a comparison result.

In addition, although in the above-described embodiments, the case has been explained as an example where the rectification transistor MN1 is always controlled to be off at the time of low load, the present invention is not limited to this. During a certain cycle, the mask signal M2 indicates the L level, the rectification transistor MN1 continues to be off, and thereby it may be determined that a current backflow has not occurred. In that case, the mask signal M2 indicates the H level during a next cycle. Such operation is repeated, and a voltage level of the mask signal M2 may be alternately switched for each cycle.

In addition, although in the embodiment 2, the case has been explained as an example where the determination signal is output from the power supply control circuit 11, the present invention is not limited to this. The case can be appropriately changed to have a circuit configuration in which the determination signal is supplied from outside.

REFERENCE SIGNS LIST

11 Power supply control circuit
12 Comparator
13 Flip-flop
14 Low load control circuit
14a Low load control circuit
141 Flip-flop
142 Delay circuit Flip-flop
143 Flip-flop Delay circuit
144 Pulse generation circuit
15 AND circuit
16 AND circuit
MP1 Output transistor
MN1 Rectification transistor
L1 Coil
C1 Capacitor

The invention claimed is:

1. A DC-DC converter comprising:
a power supply control circuit that generates first and second pulse signals of a predetermined duty ratio;
a first switching element that is provided between an input voltage terminal to which an input voltage is supplied and an external output terminal, and is controlled to be turned on and off based on the first pulse signal;
a second switching element that is provided between a reference voltage terminal to which a first reference voltage is supplied and the external output terminal, and is controlled to be turned on and off based on a second control signal;
an inductor that is provided between a connection point between the first and second switching elements, and the external output terminal;
a comparison circuit that compares a voltage of the connection point with a second reference voltage, and outputs a comparison result;
a first control circuit that outputs as a first control signal one of the second pulse signal that turns on and off the second switching element complementarily with the first switching element, and a first stop signal that turns off the second switching element, based on the comparison result; and
a second control circuit that outputs, when a detection timing is later than a reference timing in a given cycle, the first control signal as the second control signal during a next cycle, and outputs, when the detection timing is the same as or earlier than the reference timing in a given cycle, a second stop signal as the second control signal during a next cycle, the detection timing being a timing at which it has been determined by the comparison result that a current is flowing backward toward the second switching element from the external output terminal, the second stop signal being used to turn off the second switching element.

2. The DC-DC converter according to claim 1, further comprising a capacitor between a connection point between the external output terminal and the inductor, and a reference voltage terminal.

3. The DC-DC converter according to claim 1, wherein when it is determined by the comparison result that the current is flowing backward toward the second switching element from the external output terminal, the first control circuit outputs the first stop signal as the first control signal.

4. The DC-DC converter according to claim 1, wherein when it is determined by the comparison result that the current is flowing toward the external output terminal from the second switching element, the first control circuit outputs the second pulse signal as the first control signal.

5. The DC-DC converter according to claim 1, wherein the first control circuit includes: a first flip-flop that generates a first mask signal based on the comparison result and the second pulse signal; and a first AND circuit that outputs AND of the second pulse signal and the first mask signal as the first control signal.

6. The DC-DC converter according to claim 5, wherein the first flip-flop generates the first mask signal of a predetermined logical value according to a logical value of the comparison result having changed to a logical value indicating a current backflow, and initializes the first mask signal according to a logical value of the second pulse signal having changed to a logical value to turn off the second switching element.

7. The DC-DC converter according to claim 1, wherein when it is determined by the comparison result that the current is flowing toward the external output terminal from the second switching element, the second control circuit outputs the first control signal as the second control signal.

8. The DC-DC converter according to claim 1, wherein the second control circuit includes: a low load control circuit that generates a second mask signal based on the detection timing and the reference timing; and a second AND circuit that outputs AND of the first control signal and the second mask signal as the second control signal.

9. The DC-DC converter according to claim 8, wherein the low load control circuit has: a second flip-flop that generates an intermediate signal of a predetermined logical value according to a logical value of the comparison result having changed to a logical value indicating a current backflow, and initializes the intermediate signal according to a logical value of the second pulse signal having changed to a logical value to turn off the second switching element; and a third flip-flop that takes in a delay signal in which a predetermined delay has been added to the intermediate signal in synchronization with the intermediate signal, and outputs it as the second mask signal.

10. The DC-DC converter according to claim 8, wherein the low load control circuit has: a second flip-flop that generates an intermediate signal of a predetermined logical value according to a logical value of the comparison result having changed to a logical value indicating a current backflow, and initializes the intermediate signal according to a logical value of the second pulse signal having changed to a logical value to turn off the second switching element; a pulse generation circuit that generates a third pulse signal with a cycle according to the second pulse signal; and a third flip-flop that takes in the intermediate signal in synchronization with the third pulse signal, and outputs it as the second mask signal.

11. The DC-DC converter according to claim 1, wherein the reference timing is decided based on a timing of logical value change of the second pulse signal.

12. The DC-DC converter according to claim 1, wherein the first reference voltage and the second reference voltage are at the same voltage level.

13. The DC-DC converter according to claim 1, wherein the first reference voltage and the second reference voltage are at different voltage levels.

14. A control method for a DC-DC converter, the DC-DC converter comprising:

a power supply control circuit that generates first and second pulse signals of a predetermined duty ratio;

a first switching element that is provided between an input voltage terminal to which an input voltage is supplied and an external output terminal, and is controlled to be turned on and off based on the first pulse signal;

a second switching element that is provided between a reference voltage terminal to which a first reference voltage is supplied and the external output terminal, and is controlled to be turned on and off based on a second control signal; and an inductor that is provided between a connection point between the first and second switching elements, and the external output terminal, the control method comprising:

comparing a voltage of the connection point with a second reference voltage, and outputting a comparison result;

outputting one of the second pulse signal that turns on and off the second switching element complementarily with the first switching element, and a first stop signal that turns off the second switching element as a first control signal based on the comparison result; and outputting, when a detection timing is later than a reference timing in a given cycle, the first control signal as the second control signal during a next cycle, and outputting, when the detection timing is the same as or earlier than the reference timing in a given cycle, a second stop signal as the second control signal during a next cycle, the detection timing being a timing at which it has been determined by the comparison result that a current is flowing backward toward the second switching element from the external output terminal, the second stop signal being used to turn off the second switching element.

* * * * *